United States Patent [19]

Moncrief et al.

[11] Patent Number: 4,949,119
[45] Date of Patent: Aug. 14, 1990

[54] GEARSHIFT FOR A VEHICLE SIMULATOR USING COMPUTER CONTROLLED REALISTIC REAL WORLD FORCES

[75] Inventors: Rick L. Moncrief, Santa Clara; Erik J. Durfey, Los Gatos; Jacques D. Aknin, San Carlos, all of Calif.

[73] Assignee: Atari Games Corporation, Milpitas, Calif.

[21] Appl. No.: 296,552

[22] Filed: Jan. 12, 1989

[51] Int. Cl.$^5$ .............................................. G09B 9/04
[52] U.S. Cl. .................................... 364/578; 364/410; 364/508; 434/71
[58] Field of Search ....................... 364/508, 578, 410; 434/45, 71

[56] References Cited

U.S. PATENT DOCUMENTS

| | | | |
|---|---|---|---|
| 3,896,564 | 7/1975 | Dewey et al. | 434/71 |
| 3,936,955 | 2/1976 | Gruen et al. | 434/71 |
| 4,034,484 | 7/1977 | Radice | 434/71 |
| 4,150,497 | 4/1979 | Weber | 434/71 |
| 4,343,610 | 8/1982 | Chou | 434/58 |
| 4,345,817 | 8/1982 | Gwynn | 350/174 |
| 4,383,827 | 5/1983 | Foerst | 364/578 |
| 4,820,162 | 4/1989 | Ross | 434/45 |
| 4,861,269 | 8/1989 | Meenan, Jr. | 434/45 |

FOREIGN PATENT DOCUMENTS 0145598 6/1985 European Pat. Off.
2491660 4/1982 France.

OTHER PUBLICATIONS

Bak, Design New, p. 176-177 (7 Sep. 1987).
Aviation Week and Space Technology, p. 42-43 (17 Jan. 1983).
Bak, Design New, p. 154-155 (5 Oct. 1987).
Info World, p. 54 (9 Sep. 1985).
Defense Electronics, p. 37-38 (Aug. 1983).

Primary Examiner—Parshotam S. Lall
Assistant Examiner—Christopher L. Makay
Attorney, Agent, or Firm—Ronald C. Fish; Skjerven, Morrill, MacPherson, Franklin & Friel

[57] ABSTRACT

An apparatus for creating a realistic feel for a simulated gearshift, comprising a simulated gearshift for a simulated transmission in a simulated vehicle and having a gearshift lever and a simulated shift pattern for simulating the look and movements through an actual shift pattern of an actual gearshift in a vehicle. A pivoting mechanism allows the gearshift lever to pivot about at least two axes. An electrically operable clutch receives a control signal controlling the amount of force applied to the pivoting mechanism to cause resistance to movement by said shift lever along at one of the axes. A positional sensor array generates a signal from which the position of the shift lever in the simulated gearshift pattern may be ascertained. A strain gauge coupled to the gearshift lever senses the degree of strain in the gearshift lever and generates a signal telling whether an operator is pulling or pushing on the gearshift lever and in what direction. A control computer is coupled to the strain gauge and controls the operation of the clutch to provide a realistic feel.

21 Claims, 12 Drawing Sheets

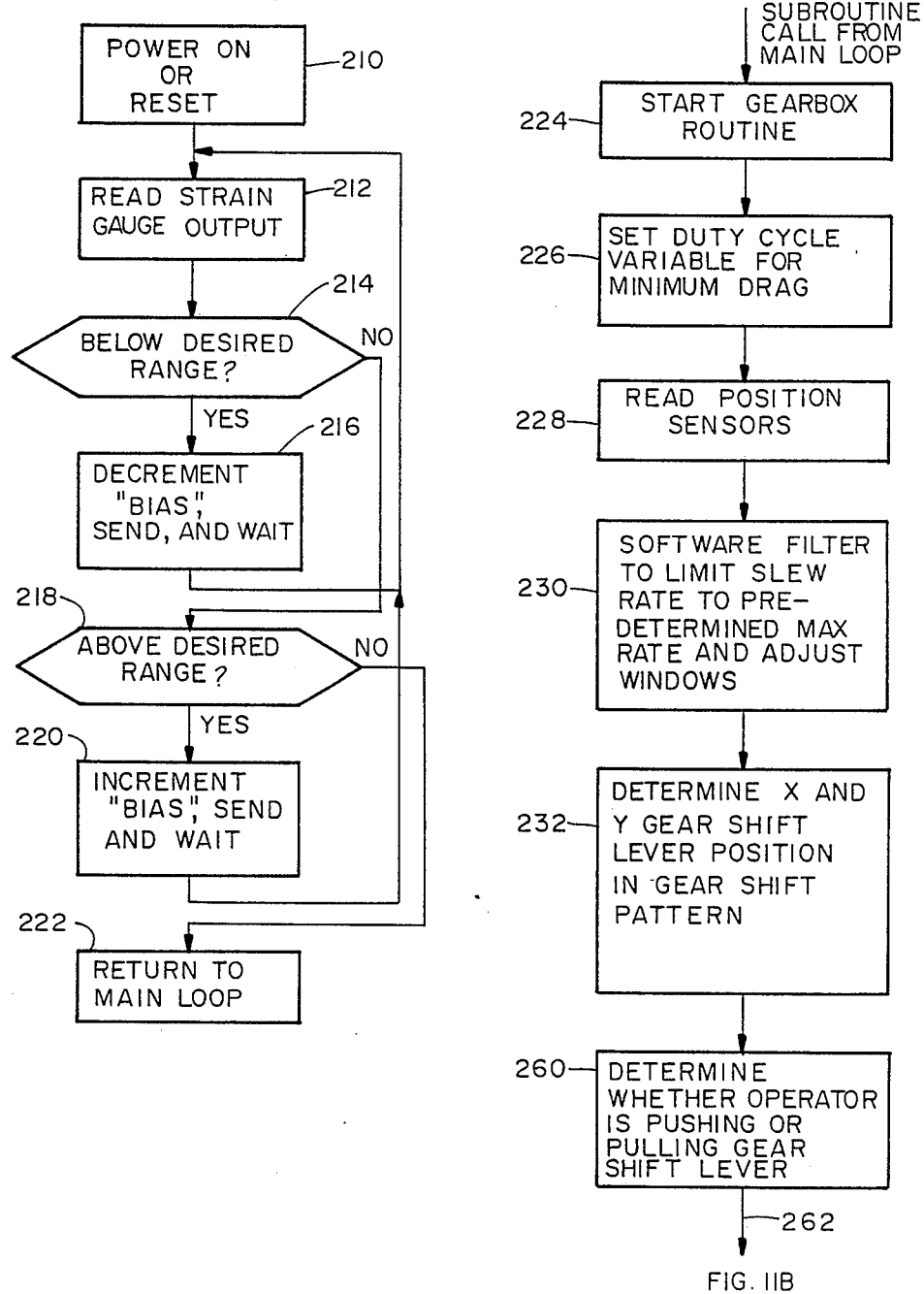
FIG. IIA

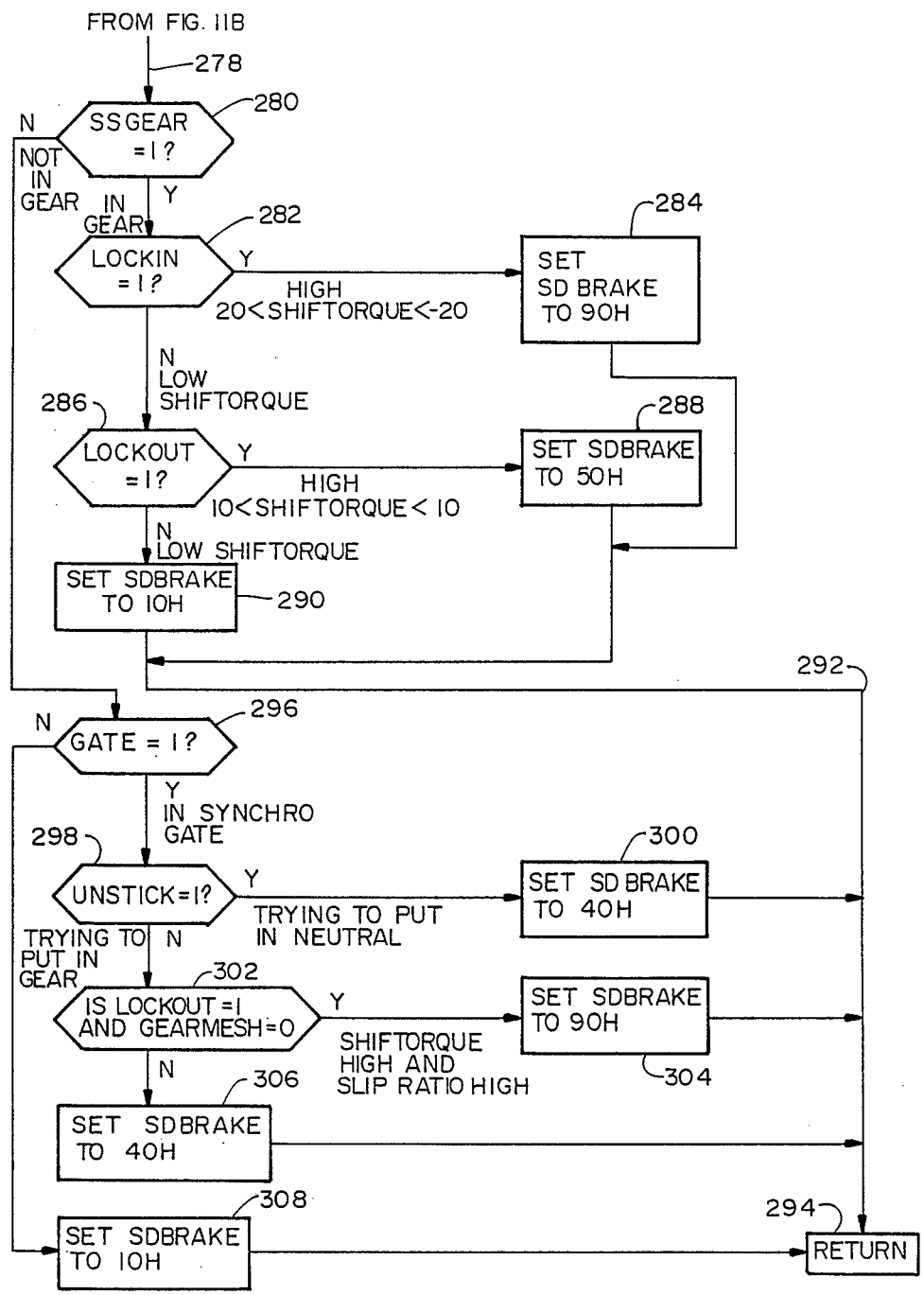
FIG. IIC

GEARSHIFT FOR A VEHICLE SIMULATOR USING COMPUTER CONTROLLED REALISTIC REAL WORLD FORCES

BACKGROUND OF THE INVENTION

The invention pertains to the field of vehicle simulators, and, more particularly, to the field of emulation of the look and field of real world control devices for vehicles. In particular, the invention simulates the forces felt by the operator in manipulating the gearshift of a car with a manual transmission using a simulated car and a simulated gearshift which is computer controlled to emulate the real world forces which would be felt if an actual vehicle were manipulated in a similar fashion to the manipulation of the simulated vehicle using the simulated control device.

Vehicle simulators have been known for a long time. In particular, aircraft simulators have long been known for use in training pilots. Such flight simulators are typified by Ghou U.S. Pat. No. 4,343,610 and Gwynn U.S. Pat. No. 4,345,817. These two patents disclose, respectively, a motion system for providing motion of the simulator in three degrees of freedom and apparatus to widen the field of view of the pilot.

Various driving simulators are also known such as that disclosed in Bouju U.S. Pat. No. 2,806,430. This driving simulator employs mechanisms to vibrate the driving seat and cabin to simulate engine vibration and to provide resistance to pedal actuation and steering. This provides more realistic feedback to the driver of the simulator. A vehicle simulator which has various control devices for manipulation by the driver such as an acceleration pedal, brake pedal, clutch pedal, gear change lever and steering wheel is taught in Foerst U.S. Pat. No. 4,383,827. This vehicle simulator uses a digital computer to provide a road vehicle driving simulation wherein the road simulation is shown on a video display and is fully interactive with control inputs from the control devices manipulated by the driver. A driving simulator with feedback forces to a steering wheel is taught in "The Automobile Driving Simulator For Anthropogenic Research" by E. Donges published as report No. FB-41 in Forschungsinstitut Fuer Anthropotechnik in July, 1978. A vehicle simulator by McFadden Systems Inc. of Santa Fe Springs, Calif. includes a steering control torque loader for real time changes in "feel" torque to be programmed into the steering wheel loader. The system consists of a DC servo unit, torque cell, servo controller, power amplifier and cables. The torque cell provides feedback for a torque servo. The servo controller/power amplifier unit contains electronic servo-compensation and power amplification to drive the DC torque motor. Spring gradient variations can be made in real time via host computer commands. This steering wheel loader has been installed in the driving simulator of a major automotive manufacturer to evaluate drive/vehicle performance over a wide variety of road conditions.

As yet however it appears that a realistic gearshift device for simulating the look and feel of an actual gearshift lever with a computer driven electrically operated clutch to resist movement of the gearshift lever as appropriate to the specific situation has yet to be developed. Thus a need has arisen for a gearshift emulation system which can simulate under very realistic conditions those forces felt by the operator of a manual transmission shift lever in an actual vehicle. Such a device could have applications in games as well as in vehicle simulators.

SUMMARY OF THE INVENTION

According to the teachings of the invention there is disclosed herein an apparatus and a method for emulating the look and feel of an actual manual transmission in a real vehicle through use of a simulated gearshift lever having an electrically operated clutch, position sensors, strain gauges and a computer coupled to all of the above. The computer senses the position of the gearshift in a simulated gearshift pattern and senses the strain on the gearshift lever indicating which direction the operator is trying to push or pull the gearshift lever. The computer also receives data from any other external source such as another computer in a simulator. This data indicates the amount of torque being applied to the simulated gears of the simulated transmission to which the simulated gearshift lever is hypothetically coupled. The data also indicates the relative slip ratio (ratio of angular velocities between the gears to be engaged) between the simulated gears of the simulated transmission. The computer then makes a judgment based upon all these conditions regarding whether an operator who is attempting to move the gearshift lever of the simulated transmission should be allowed to move the gearshift lever or not based upon whether such a movement would be permitted in an actual transmission under similar circumstances. The decision as to whether to allow the operator to move the gearshift lever or not is based upon whether the operator is trying to move the shift lever to engage a particular gear, the relative slip ratio of the gears to be engaged, the torque passing through the simulated transmission and upon several other factors. If it is decided that the operator should not be allowed to place the simulated transmission into a simulated gear, the electrically operated clutch is driven by the computer so as to impose frictional drag on a pivoting mechanism through which the simulated gearshift lever pivots. This friction is applied in such a manner as to supply sufficient frictional force thereto to disallow movement of the gearshift lever.

If the operator of the simulated transmission has the simulated transmission engaged in a particular gear and is trying to pull the gearshift lever in such a manner as to disengage the particular gear, the computer senses this through the position sensors and strain gauge or strain gauges. The computer then examines the torque data received from the outside source indicating how much torque is being applied through the transmission. If the torque level is too high, the computer will prevent the operator from pulling the simulated transmission gearshift lever out of gear by driving the electrically operated clutch to apply sufficient frictional force to the pivotal mechanism to disallow movement of the simulated gearshift lever. This action is based on the fact that for an actual manual transmission under the same conditions of high torque, the transmission could not be disengaged from the gear currently being used.

Many manual transmissions in actual vehicles have what are called synchronization gates. When the gearshift lever of an actual transmission is moved into gear or out of gear, a "synchro gate" must be passed. The synchro gate causes the two gears to be engaged in the actual transmission to be brought to approximately the same angular velocity such that the gears can be engaged quietly and smoothly. When an actual transmission shift lever is moved through such a synchro gate, a small increase in force is felt through the gearshift lever as the synchro gate performs its function. The same slight increase in drag on the gearshift lever of an actual transmission occurs when the gearshift lever is moved to pull the transmission out of gear and into neutral. The gearshift simulator of the invention simulates this small increase in force by sensing when the gearshift lever is at the position where a synchronization gate would normally be felt in the simulated shift pattern and by driving the electrically operated clutch so as to increase the frictional force applied to the pivotal mechanism somewhat so as to impede but not stop the gearshift lever as it moves through the synchro gate thereby emulating the feel of a synchro gate in an actual transmission.

BRIEF DESCRIPTION OF THE DRAWINGS

FIGS. 11A, 11B and 11C comprise a flow diagram of the software which is run to control the electrically operated clutch to emulate the feel of an actual transmission.

DETAILED DESCRIPTION OF THE PREFERRED EMBODIMENTS

Figure 1:
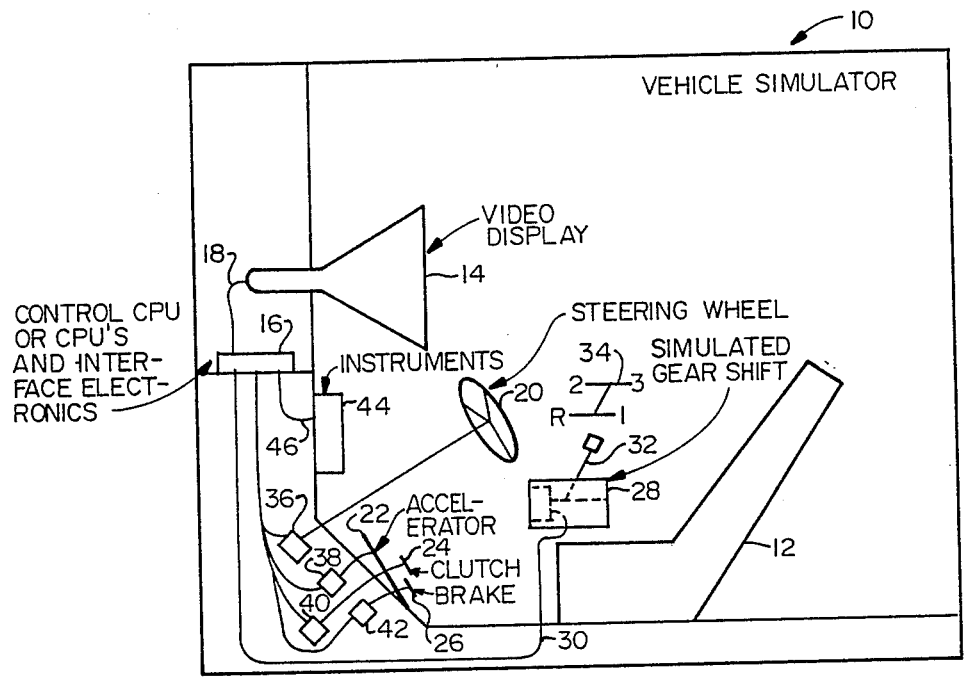
FIG. 1 is a schematic diagram of a typical vehicle simulator or game in which the invention may be used.

Referring to FIG. 1, there is shown a typical vehicle simulator environment in which the teachings of invention may be carried out. A vehicle simulator 10 is comprised of a seat 12 for the operator and a video display 14 through which the operating environment is displayed. The video display 14 is driven by driver electronics 16. These driver electronics may be comprised of one or more CPUs or microprocessors and other interface electronics. The driver electronics is shown coupled to the video display 14 by cable 18. The operator of the simulator (not shown) is seated before various vehicle control devices such as steering wheel 20, accelerator 22, clutch 24 and brake 26. The driver may also manipulate a simulated gearshift 28 having a simulated gearshift lever 32 and which implements the teachings of the method and apparatus of the invention disclosed herein. The purpose of the gearshift 28 is to emulate the look and feel of an actual gearshift for a manual transmission in an actual vehicle. The control CPU or CPUs and interface electronics (hereafter controlled control unit 16) is coupled to the simulated gearshift 28 by a cable 30.

Each of the steering wheel 20, accelerator 22, clutch 24 and brake 26 has transducers coupled thereto to sense movement of the control device in question and, in some cases, to provide tactile feedback to the driver in accordance with the actual forces which would be felt by the driver in manipulating the corresponding control device in an actual vehicle under conditions similar to those currently being simulated in the vehicle simulator 10. The simulated gearshift 28 also has one or more transducers (not shown) which provide feedback to the operator manipulating the simulated gearshift lever 32 and for sensing the position of the simulating gearshift lever 32 in a simulated gearshift pattern shown symbolically at 34 and described in more detail in conjunction with the discussion of FIG. 12. Other transducers (not shown) in the simulated gearshift 28 provide information regarding whether the operator is pushing or pulling on the gearshift lever 32. A transducer 36 for the steering wheel 20 is provided to sense the turning or lack thereof of the steering wheel 20 by the driver. A transducer 28 coupled to the accelerator 22 senses the amount of power the driver wishes to apply to a simulated transmission (not shown) from a simulated engine (not shown). A transducer 40 coupled to the clutch 24 senses when the clutch is depressed, and a transducer 42 coupled to the brake 26 senses when the brake is depressed.

The control unit 16 senses all the command inputs from the driver through the various vehicle control devices described above and computes the position, speed and direction of travel of the simulated vehicle in a simulated universe. The speed of travel, engine RPM, fuel and other typical information is displayed to the driver through a simulated instrument panel which can be either a stand alone unit such as that shown in 44 or displayed instruments having displayed readings on the video display 14. The instruments 44 are coupled to the control unit 16 by a cable 46.

One of the functions of the control unit 16 is to cause the simulated gearshift 28, through the simulated gearshift lever 32, to feel like an actual gearshift lever in a manual transmission when that manual transmission is subjected to similar conditions to those being simulated. To do this, the control unit 16 requires certain information regarding the position of the gearshift lever 32 in the gearshift pattern 34, whether the operator is pushing or pulling on the gearshift lever 32 to put the simulated transmission in gear or take it out of gear, and a means by which a microprocessor or a computer in the control unit 16 may cause resistance to movement of the simulated gearshift lever 32.

There will next be described the mechanical configuration of one embodiment of a simulated gearshift lever mechanism which may be used to emulate the look and feel of an actual gearshift lever for a manual transmission in an actual vehicle. This mechanical configuration includes transducers to provide information to the control unit 16 to carry out commands from the control unit 16 to cause the appropriate resistance to movement by the shift lever 32.

Figure 2:
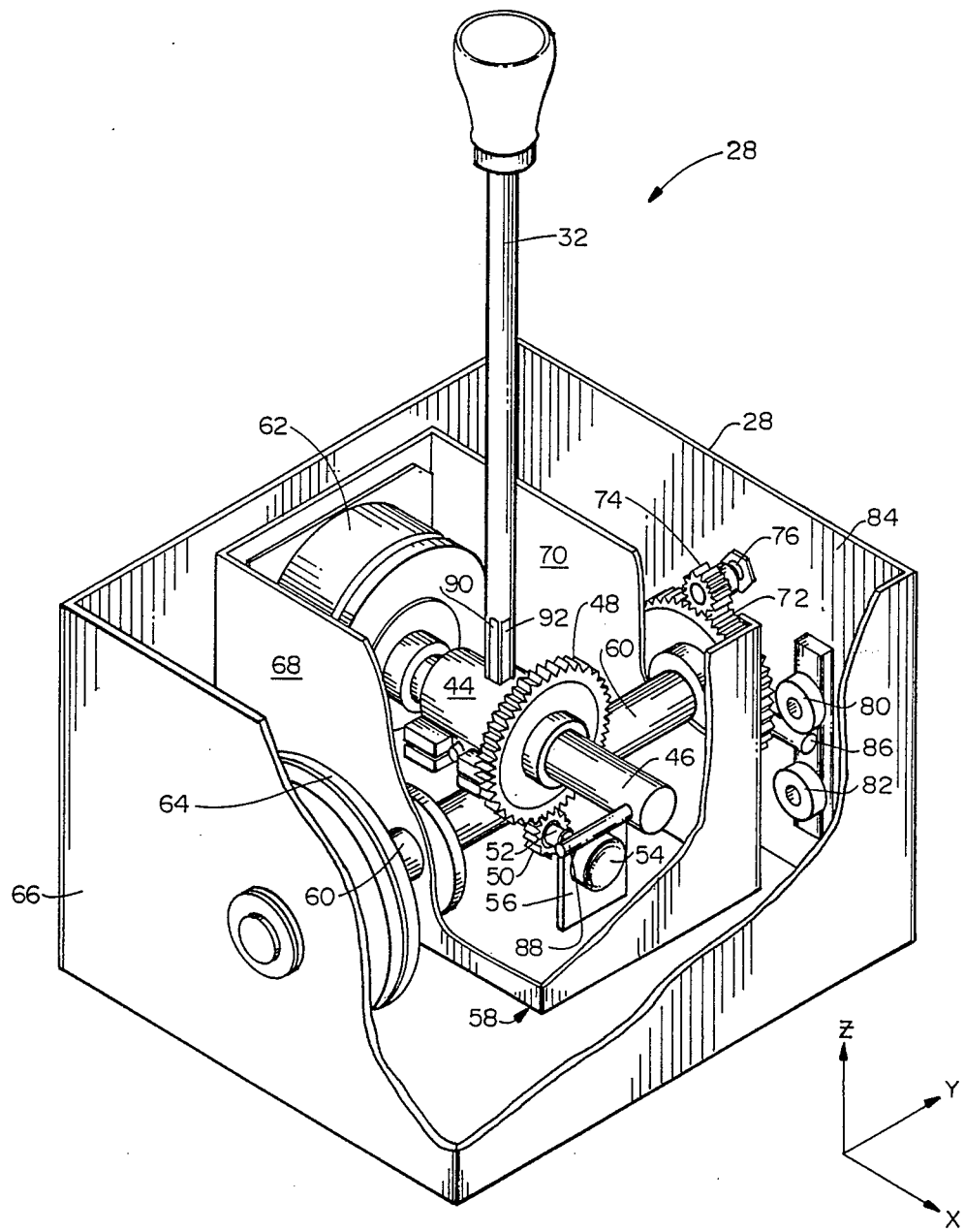
FIG. 2 is a perspective view of a two clutch embodiment of the simulated gearshift lever and pivotal mechanism.
Figure 3:
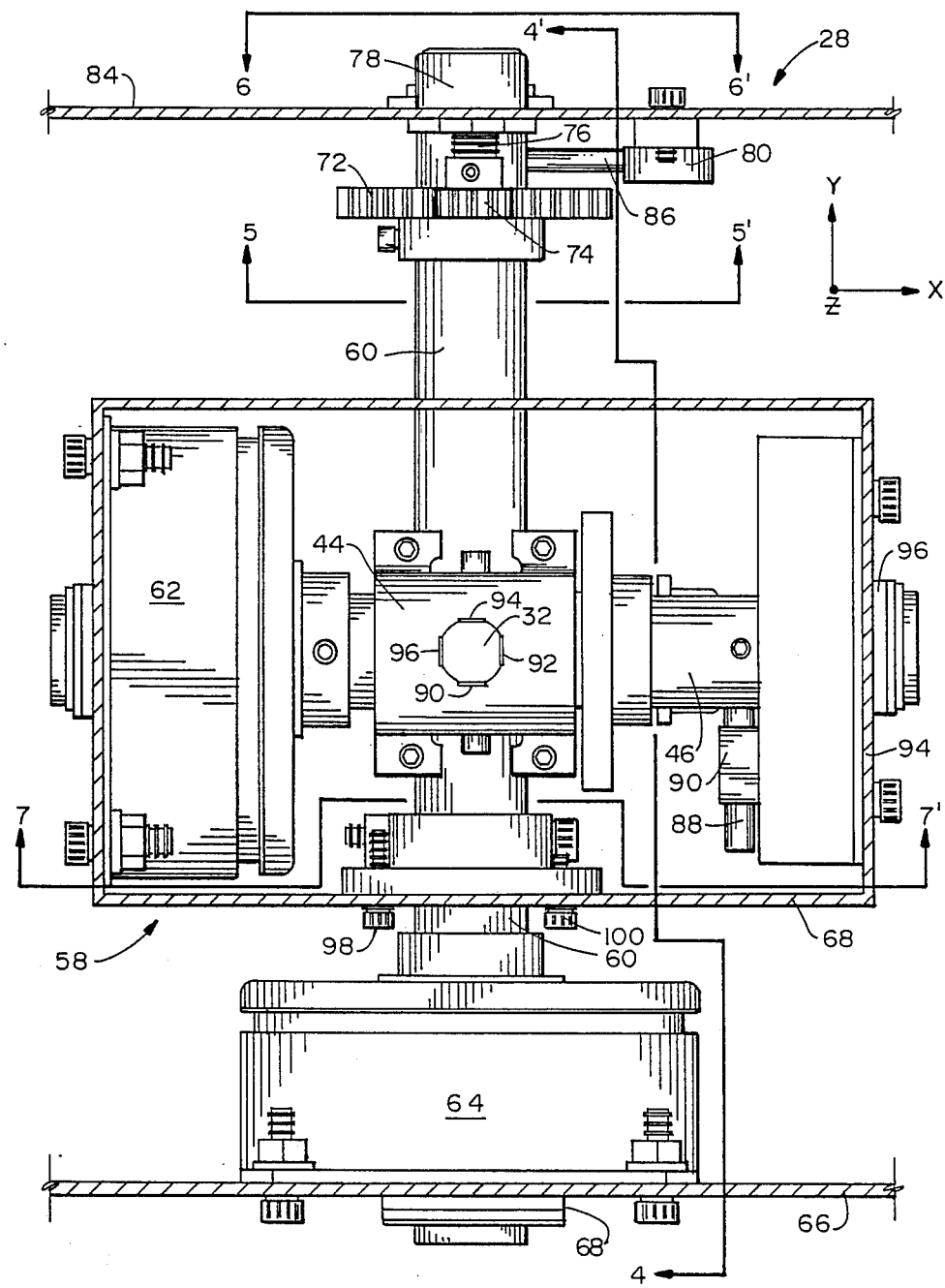
FIG. 3 is a top view of the device of FIG. 2.
Figure 4:
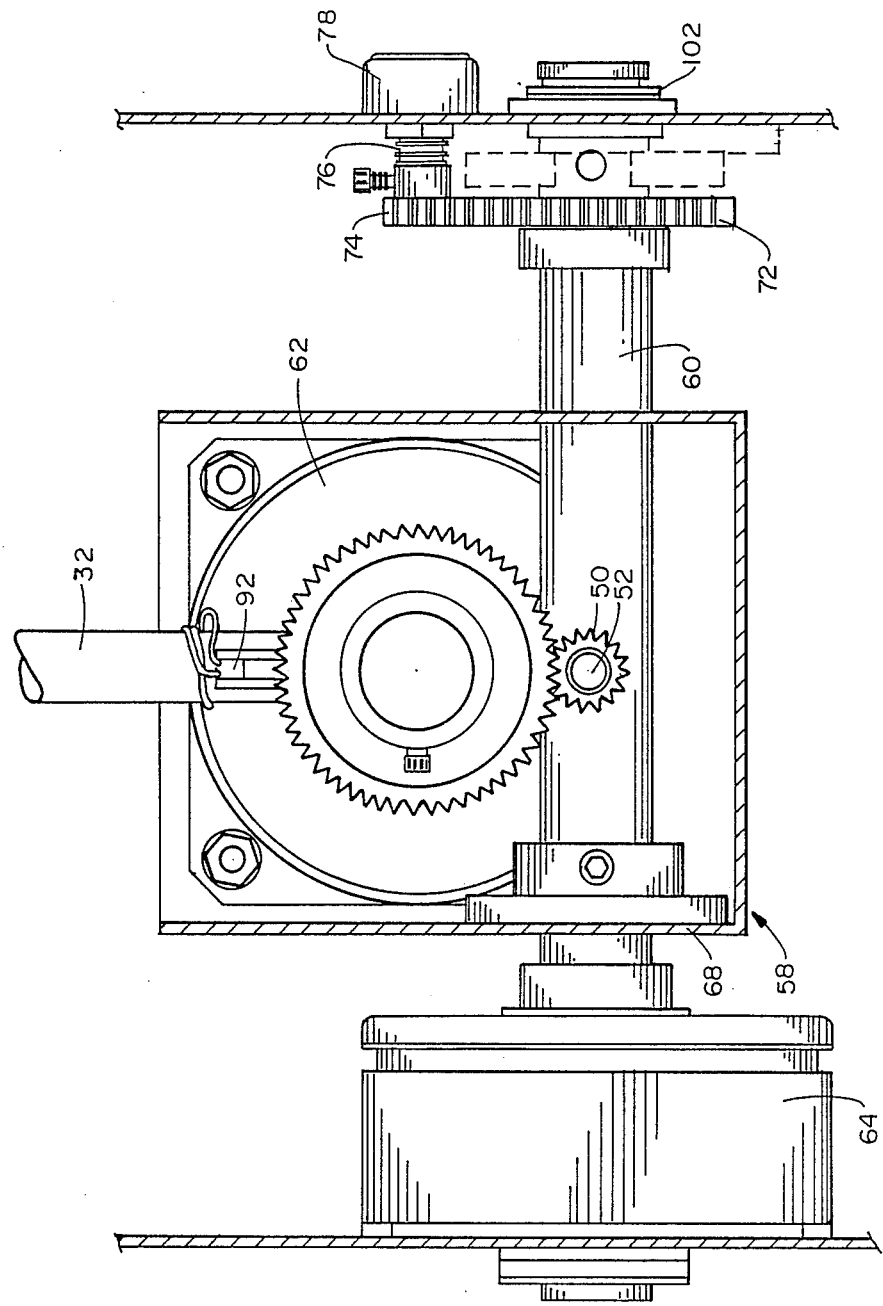
FIG. 4 is a sectional view through the device of FIG. 2 taken along the section line marked 4-4' in FIG. 3.
Figure 5:
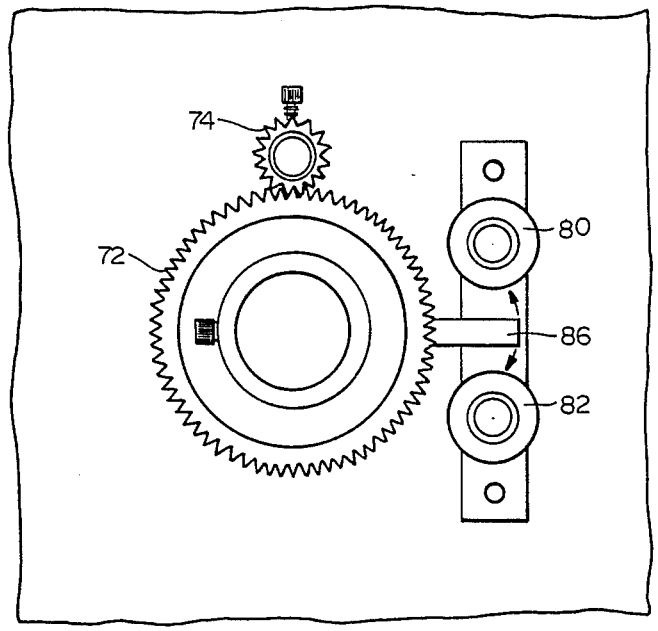
FIG. 5 is a cross sectional view of the device of FIG. 2 taken along the section line marked 5-5' in FIG. 3.
Figure 6:
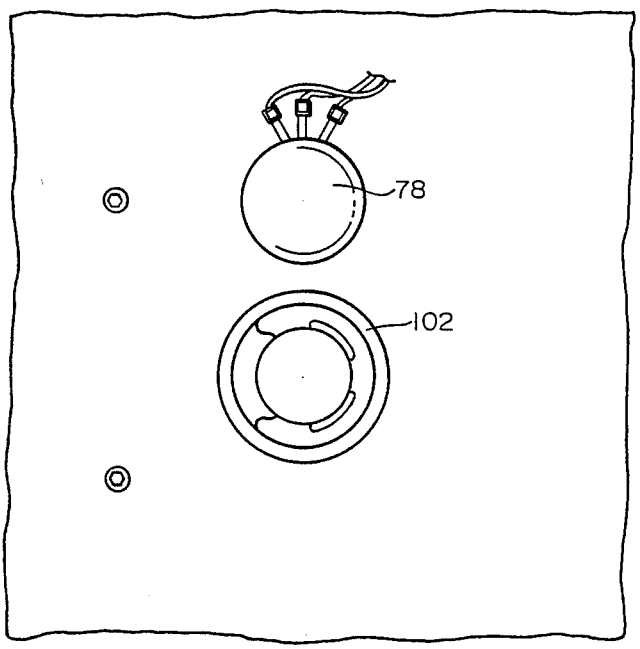
FIG. 6 is a cross sectional view of the device of FIG. 2 taken along the section line marked 6-6' in FIG. 3.

Referring to FIGS. 2-7, a suitable mechanical configuration for a simulated gearshift which may be used to implement the teachings of the invention are shown. FIG. 2 shows a cutaway perspective view of the simulated gearshift mechanism, while FIG. 3 shows a top view of the device. FIGS. 4 through 7 are sectional views of the device taken through the section lines marked with corresponding figure numbers as shown in FIG. 3. Like numbered elements in FIGS. 2 through 7 represent the same mechanical element throughout these figures.

Referring first to FIG. 2, the shift lever 32 is mechanically affixed to a coupling 44 such as by threading the shift lever 32 into a threaded hole in the coupling 44. The coupling 44 is affixed to a shaft 46 which rotates about the X axis. The coupling 44 has a gear 48 which engages a second gear 50. The second gear 50 is affixed to a shaft 52 which is coupled to a potentiometer 54 mounted on a bracket 56. The bracket 56 is mounted to a rotating subassembly 58. The rotating subassembly 58 is affixed to a second shaft 60 which rotates about the Y axis. The purpose of the gear 48, gear 50, shaft 52 and potentiometer 54 is to provide feedback to the control unit 16 regarding where in the simulated gearshift pattern the shift lever 32 currently is. The shaft 46 is coupled to the movable element of an electrically operated clutch 62 which is affixed to one wall of the rotating subassembly 58. The shaft 60 is coupled to the movable element of a second electrically operated clutch 64 which is affixed to one wall of a frame 66.

The shaft 60 is affixed to a wall 68 and a wall 70 of the rotating subassembly 58 such that when the shaft 60 turns, the entire rotating subassembly 58 turns with it, thereby rotating about the Y axis. Thus, when the shift lever 32 is pushed or pulled along a direction parallel to the X axis, the rotating subassembly 58 transmits this force to the shaft 60 and causes the shaft 60 to rotate in the electrically operated clutch 64. Likewise, when the shift lever 32 is pulled or pushed along the Y axis, the coupling 44 transmits this force to the shaft 46, thereby causing the shaft 46 to rotate within the electrically operated clutch 62. This does not cause any motion by the rotating subassembly 58.

The aforementioned rotations of shafts 60 and 46 occur only if the electrically operated clutches 62 and 64 permit the movement. Both of these clutches are electrically coupled to the control unit 16 and receive control signals therefrom. These control signals control the amount of frictional force applied by the electrically operated clutches to the shafts 60 and 46 through the movable elements of these clutches. Essentially, these clutches represent brake drums having concentric brake pads therein which are supported by and affixed to the shafts 60 and 46. Electromagnetic apparatus within these clutches 62 and 64 cause more or less force to be exerted between the brake shoe and the brake drum, thereby causing a variable level of frictional force resisting rotation of the corresponding shaft to exist. In this manner, the control unit 16 can resist or completely stop rotation of shaft 46 by proper manipulation of the driving current for the electromagnetic coils of the clutch 62. Likewise, the control unit 16 can resist or stop rotation of shaft 60 by appropriate manipulation of the driving current of the electromagnetic coils of the clutch 64.

Feedback regarding the angular position of the shift lever 32 relative to the Z axis in view of rotation about the Y axis is provided by a gear 72, a gear 74 and a potentiometer coupled to the gear 74 by a shaft 76. The potentiometer is not shown in FIG. 2, but it may be seen in FIG. 3 as potentiometer 78. Limits to the angular motion about the Y axis for the shaft 60 are provided by two rubber bumpers 80 and 82 affixed to the wall 84 of the frame 66. These two rubber bumpers 80 and 82 are spaced apart by a short distance. A projecting member 86 extends from a permanent site of fixation to shaft 60 to a location between the rubber bumpers 80 and 82. When shaft 60 rotates about the Y axis, this rotation is translated at the tip of projecting member 86 into arcuate motion up and down the Z axis. When the member 86 strikes either the bumper 80 or 82, rotation of the shaft 60 is stopped.

The shift lever 32 has strain gauges affixed thereto at the location of the intersection between the shift lever 32 and the coupling 44. Four flat, rectangular areas are machined into the material of the shift lever 32 at 90, 92, 94 and 96, as best seen in FIG. 3. Permanently affixed to these flat areas are four individual strain gauges which will be represented by the reference numerals 90, 92, 94 and 96. These strain gauges are well known in the art, and consist of a strip of resistive material which is photolithographically formed on a substrate in a serpentine pattern. The substrate is then mechanically bound to the member in which strain is to be detected. When the member stretches or compresses, the resulting strain causes the length of the serpentine pattern of resistive material to be altered. This changes the resistance of the strain gauge and may be detected by suitable interface circuitry to be described below.

Figure 7:
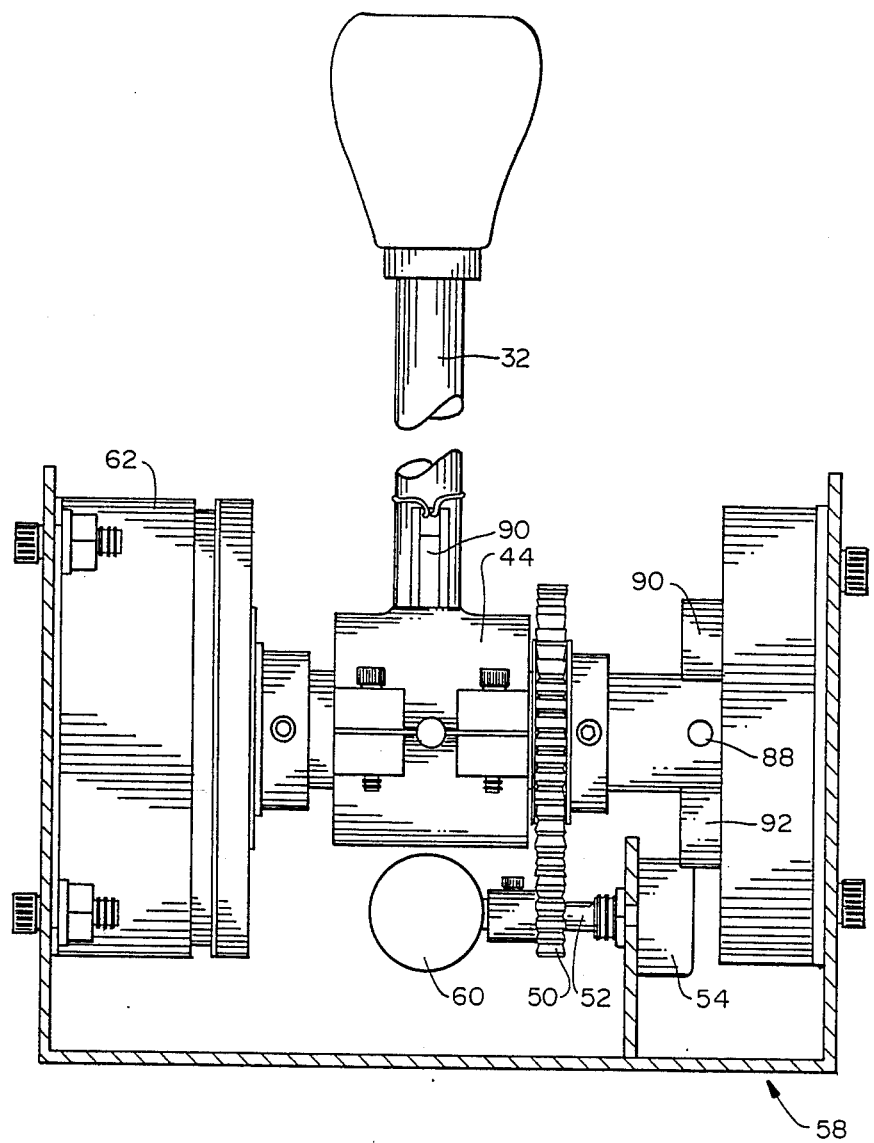
FIG. 7 is a cross sectional view of the device of FIG. 2 taken along the section line marked 7-7' in FIG. 3.

Rotation of shaft 46 about the X axis is constrained in a similar manner to the constraint of the rotation of shaft 60 through use of a member 88 which extends from and is affixed to the shaft 46. Two rubber bumpers 90 and 92 are affixed to a wall 94 of the rotatable subassembly 58 and are separated by a short distance. The extending member 88 extends between these two rubber bumpers 90 and 92, as best seen in FIG. 7. Rotation of the shaft 46 about the X axis translates into arcuate motion of the extending member 88. When this member contacts either of the rubber bumpers 90 or 92, rotation of the shaft 46 is stopped. The shaft 46 is rotatably coupled to the wall 94 of the rotating subassembly 58, as best seen in FIG. 3, by a bearing 96.

As best seen in FIG. 3, the rotating shaft 60 is affixed to the wall 68 of the rotating assembly 58 by two machine screws 98 and 100. These machine screws transmit rotational motion of the shaft 60 to rotation of the rotating subassembly 58. To be absolutely precise, the rotating subassembly 58 does not in fact rotate, but only pivots between arcuate limits about the Y axis. The shaft 60 is rotatably coupled to the wall 84 of the gearshift assembly 28 by a bearing 102, best seen in FIG. 4.

Figure 8:
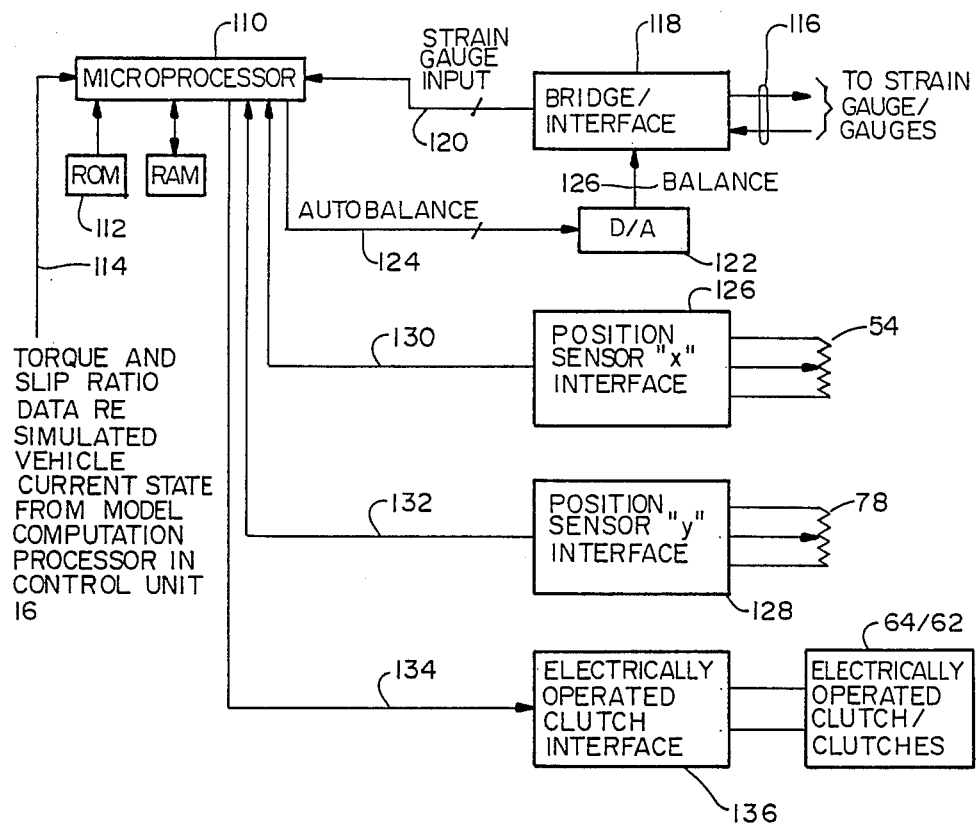
FIG. 8 is a block diagram of the electronics of the apparatus of the invention.

Referring to FIG. 8, there is shown an electronic block diagram of the electronic apparatus forming part of the invention. A microprocessor 110 runs a program stored in read-only memory 112 in order to sense certain conditions at the gearshift, receive data regarding conditions in the simulated vehicle, and control the electrically operated clutch or clutches 64/62 according to this data to simulate real world forces. The microprocessor 110 may also be a mainframe computer or minicomputer, but microprocessors are preferred since they are cheaper and smaller. The microprocessor receives torque and slip ratio data defining the status of the simulated vehicle and its simulated transmission on bus 114. This data comes from a model computation processor (not shown) in control unit 16, which is not part of this invention. The microprocessor 110 also receives data regarding whether the operator is pulling or pushing the simulated gearshift lever 32 via strain gauges coupled via lines 116 to a bridge 118. Only one bridge and one pair of lines to the strain gauges is shown to symbolize all the strain gauges. One bridge and one pair of conductors is needed for each strain gauge.

Because the resistance of the strain gauge serpentine path changes so little during strain of the material of the gearshift lever 32, a bridge and strain gauge interface circuit 118 is used to detect the slight changes. The bridge/interface 118 also includes interface circuitry to convert the analog bridge output signal to a digital format suitable for use by the microprocessor 110. The output of this interface circuitry is read by the microprocessor 110 via bus 120.

One of the difficulties of using strain gauges is that they have temperature drift characteristics. Silicon strain gauges have 100 times the sensitivity of metal strain gauges, and are preferred, but they also have a much higher temperature drift than metal strain gauges. Because it is desired to have low temperature drift characteristics, metal strain gauges are used in the preferred embodiment of the invention. For the strain gauge circuitry to work properly, it is necessary that the bridge 118 be kept balanced even if the strain gauge characteristics change with changing temperature. Normally, a bridge has two nodes which have voltages which are close together when the bridge is balanced. When the bridge becomes unbalanced by virtue of a change in one of the components making up the bridge, the voltages between these two nodes shifts. It is desirable in the quiescent state when no strain is being experienced by the simulated gearshift lever 32 that the bridge be balanced. However, in mass production techniques, and with changing ambient conditions, it is impossible to obtain circuit component tolerances and temperature characteristics such that the bridge will always remain balanced. In order to insure that the bridge remains properly balanced during operation of the vehicle simulator or game embodying the system of the invention, the microprocessor is programmed to sense the balanced state of the bridge and to correct this state if the bridge is unbalanced. This correction is done through a digital-to-analog converter 122 and an autobalance signal on a bus 124. The microprocessor 110 balances the bridge 118 by periodically sampling the voltage at the output node of the bridge. This voltage is converted to a digital number by analog-to-digital circuitry in the bridge/interface 118 and output on bus 120 to the microprocessor. The microprocessor compares this voltage to a desired range of voltages and then loads an AUTOBALANCE digital number via bus 124 into digital-to-analog converter 122. The digital-to-analog converter converts this number received from the microprocessor to a BALANCE signal on line 126 in an analog format. This analog signal is applied to the bridge at an appropriate location which will tend to balance the bridge. This process of sampling the bridge output, comparing the bridge output to a desired range of voltages, loading a digital number into the digital-to-analog converter, and applying the resulting analog voltage to the bridge continues until the bridge is forced back into balance.

The microprocessor 110 determines the position of the simulated gearshift lever 32 and the simulated shift pattern 34 through X and Y position sensor, 54 and 78, respectively. These position sensors are potentiometers in the preferred embodiment, and are coupled to the microprocessor 110 through interface circuits 126 and 128, respectively. Position sensor interface 126 is coupled to microprocessor 110 by bus 130. Position sensor interface 128 is coupled to microprocessor 110 by bus 132.

The microprocessor 110 uses the data gathered from the strain gauges and position sensors along with the torque and slip ratio data received from another source via bus 114 to evaluate the amount of frictional force to be applied to the pivoting mechanism for the gearshift lever 32 via the electrically operated clutch or clutches 64/62. The details of this processing by the microprocessor will be given below in connection with the discussion of the flow charts. Basically, the microprocessor determines where in the shift pattern the shift lever is so as to be able to determine whether the simulated transmission is in a particular gear or if the gearshift lever 32 is being moved through a "synchro" gate on the way into or out of a particular gear. The microprocessor then determines whether the operator is pushing or pulling on the gearshift lever by reading the strain gauges. The microprocessor then inquires as to the level of torque which is being applied to the gears in the transmission by the engine and the slip ratio between gears to be engaged if the gearshift lever is in a position where the simulated transmission is not in gear. All these factors are combined to determine whether the operator is trying to push the simulated transmission into gear where the slip ratio is too high to allow effective meshing or is trying to push the transmission into a gear when the clutch is not depressed and torque is being applied. In either situation, an actual transmission would not go into gear, and the microprocessor 110 sends a command on bus 134 to cause the electrically operated clutch interface 136 to drive the electrically operated clutch or clutches to prevent the simulated gearshift lever 32 from being moved further toward the position of the desired gear. Likewise, the microprocessor determines if the operator is trying to pull the simulated transmission out of a gear where the torque level passing through the transmission is too high. In such a case, in an actual transmission, the gearshift lever could not be moved to pull the transmission out of gear if the torque level was high enough. If this situation is found to exist in the simulated transmission, the microprocessor 110 sends a command on bus 134 to the clutch interface 136 so as to prevent the simulated gearshift lever 32 from being moved to pull the simulated transmission out of gear. Likewise, the microprocessor 110 determines if the gearshift lever 32 is being moved past a synchro gate on the way into or out of a gear and determines the slip ratio between the simulated gears in the simulated transmission from the data on bus 114 received from the model computation processor (not shown). If the slip ratio is such that in an actual transmission the two gears to be engaged were revolving at sufficiently close angular velocities to engage, then the microprocessor 110 sends a command on the bus 134 to simulate the slight force of the synchro gate which would be felt in an actual transmission in this situation. That is, a command is sent to cause the interface 136 to drive the electrically operated clutch 64/62 such that some frictional force is applied to the pivotal mechanism, thereby resisting but not stopping the movements of the simulated gearshift lever 32 as it moves through the synchro gate. However, the force applied is not such that movement of the simulated gearshift 32 is completely stopped. If the slip ratio indicates that the two gears to be engaged are going at vastly different speeds such that a synchro gate in an actual transmission would not permit the two gears to be engaged, the microprocessor 110 sends a command on the bus 134 to cause the interface 136 to drive the electrically operated clutch 64 so as to completely stop movement of the gearshift lever 32 at the position of the synchro gate such that the simulated transmission cannot be placed in the desired gear.

Before expanding on the operation of the microprocessor 110, further details of the electrical circuitry of the bridge interface 118 and the electrically operated clutch interface 136 will be given with reference to FIGS. 9 and 10. These two figures represent two halves of a logic block diagram of the actual circuitry used in the preferred embodiment to implement the bridge and interface 118 and the electrically operated clutch interface 136. These two figures should be assembled along the cut line to form a complete logic diagram.

Figure 9:
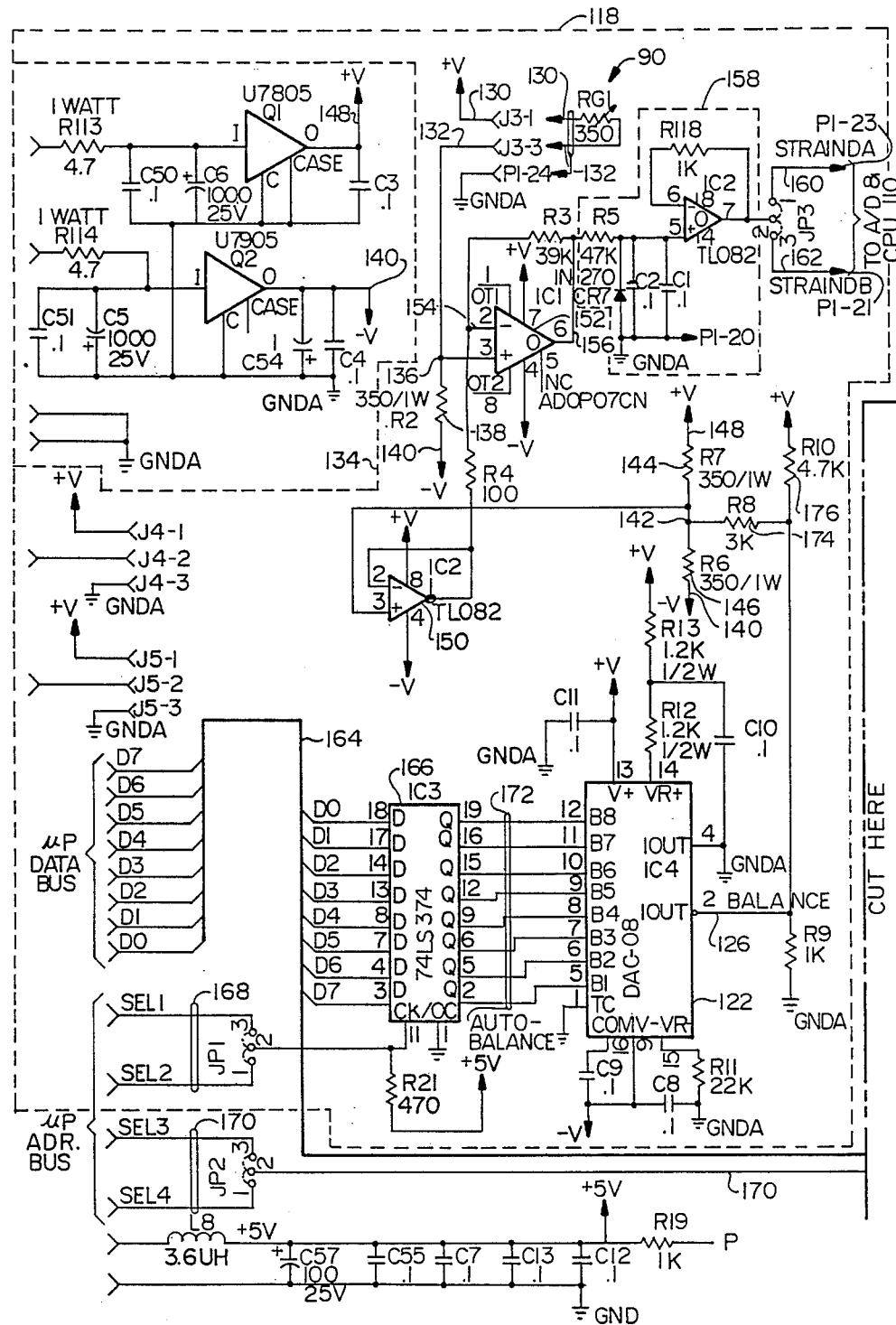
FIGS. 9 and 10, taken together, comprise a detailed logic diagram of the bridge and bridge interface and the electrically operated clutch interface.

Referring to FIG. 9, the details of the bridge/interface 118 are shown. A typical strain gauge is shown at 90. The strain gauge is shown as a variable resistor having two leads 130 and 132. The lead 130 is connected to the +V voltage supply, which is supplied by a regulated power supply having very stable characteristics shown at 134. This stabilized voltage causes a current in line 132 which varies with the amount of strain being experienced by the gearshift lever 32 (not shown). This current is converted to a voltage at a node 136 by a resistor 138 having its other terminal connected to the −V supply 140. Node 136 is one of the balance points of the bridge, the other balance point being node 142 at the junction between resistors 144 and 146. These resistors are connected respectively to the +V supply line 148 and the −V supply line 140. When the bridge is balanced, the voltage at the nodes 136 and 142 are equal. The quiescent starting condition is with the bridge balanced and no strain causing any change in the resistance of the strain gauge 90.

The voltage on the node 142 is coupled to the input of a source follower 150 which isolates the node 142 from the input impedance of a differential amplifier 152. The source follower 150 has a gain of approximately 1 and merely transmits the voltage at the node 142 to the inverting input 154 of the differential amplifier while preventing any voltage on node 154 from effecting the voltage at node 142. The differential amplifier amplifies the difference between the voltages at nodes 154 and 136 as the strain gauge output. The amplified difference voltage at the output 156 of the differential amplifier represents the amount of strain being experienced by the shift lever 32 when the bridge is balanced. This output voltage is applied through a source follower and isolation network 158 to the strain gauge output lines 160 or 162, depending upon the state of a jumper designated JP3. The purpose of the source follower and isolation network is to isolate the strain gauge and bridge circuity from the analog-to-digital circuitry (not shown), to which lines 160 and 162 are coupled. This analog-to-digital circuitry converts the strain gauge output to a digital number and outputs it on bus 120, shown in FIG. 8. The data on bus 120 is read by the microprocessor 110 as the output of the strain gauge 90.

The foregoing circuitry is duplicated for each strain gauge in the system.

The bridge is automatically, digitally balanced by the microprocessor 110 using the autobalance data word on bus 124 in FIG. 8. In reality, the bus 124 is the data bus of the microprocessor shown as lines D0 through D7 at 164 in FIG. 9. The autobalance data is whatever data is on the data bus 164 whenever a latch 166 is selected using the signals SEL1 and SEL2, shown at 168. The signal lines SEL1 and SEL2, as well as the signals SEL3 and SEL4, shown at 170, are part of the address bus of the microprocessor 110 in FIG. 8. When the microprocessor wishes to balance the bridge, it writes an appropriate address onto the address bus such that the latch 166 is enabled. An appropriate digital word is then written on the data bus and latched into the latch 166. The latch 166 is an octal D-type transparent latch comprised of edge-triggered flip-flops. The data so loaded into latch 166 is then presented on output bus 172 to a digital-to-analog converter 122. The digital-to-analog converter 122 outputs an analog voltage on line 126, the BALANCE signal, which is applied to the node 142 through a voltage divider network comprised of the resistors 174 and 176. The voltage on line 126 will be called the balance signal and alters the voltage at the node 142 of the bridge. The microprocessor 110 then samples the data on the bus 120 on FIG. 8 to determine the voltage difference between the nodes 136 and 154 at the inputs to the differential amplifier 152.

The process of writing digital words to the digital-to-analog converter 122 and sampling the digital data on the bus 120 is repeated until the data on the bus 120 indicates that the voltage differential between the nodes 136 and 154 has reached an acceptable level. This acceptable level is preferably zero volts differential between nodes 136 and 154 for perfect balance. However, offset voltages, noise, thermal drift and other circumstances may require than an acceptable voltage range for the voltage differential between nodes 136 and 154 be defined. This range can be experimentally determined for any particular embodiment.

Figure 10:
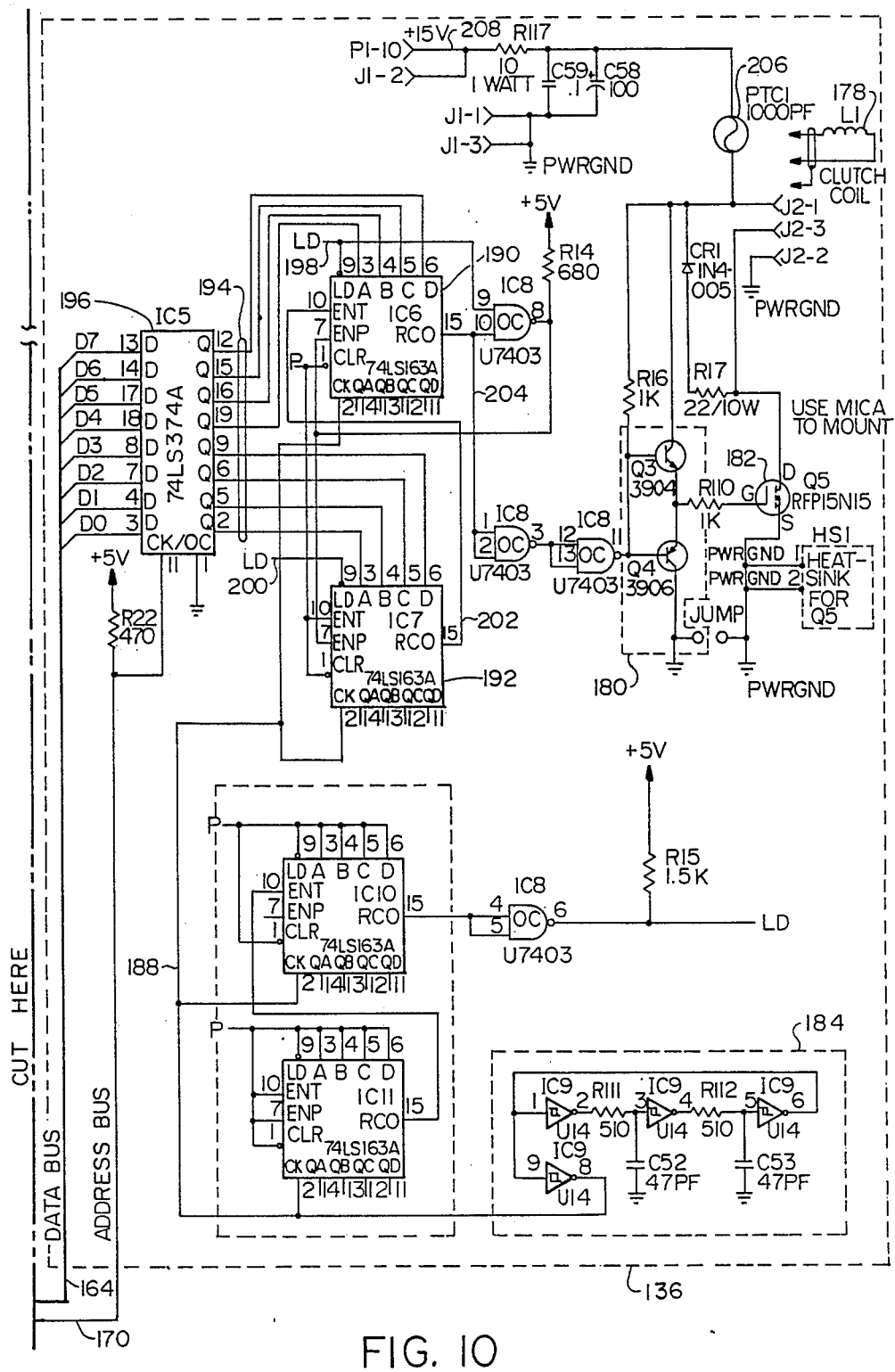

Referring to FIG. 10, the details of the electrically operated clutch interface 136 are shown. The clutch interface basically operates on a duty cycle or pulse width modulated basis where the particular duty cycle or pulse width modulation "on-time" is defined by a digital word received from the microprocessor 110 on data bus 164. The electromagnetic coil of the electrically operated clutch 64 (only one clutch is assumed for this embodiment) is shown at 178. This clutch is driven by a pair of push-pull NPN and PNP transistors 180 driving a power MOSFET 182. A clock 184 provides the basic time base for the duty cycle control. A frequency divider 186 divides the clock frequency to a lower frequency on line 188.

The clock frequency on line 188 is counted by a pair of counters 190 and 192. These counters may be preloaded with terminal counts via data on the bus 194. It is the data on the bus 194 that sets the duty cycle.

The duty cycle is set by loading a digital number representing any decimal number between 0 and 255 into a latch 196. This is done by the microprocessor 110 by selecting the latch 196 via the SEL3 and SEL4 signal lines 170 in FIG. 9 of the address bus. The latch 196 is enabled and loaded by placing the appropriate data on the data bus 164 to define the duty cycle desired and then raising either the SEL3 or SEL4 signal (depending upon the state of the jumper JP2 in FIG. 9). This enables the +5 volt supply voltage to raise pin 11 of the latch 196 to a logic 1 level, thereby loading the data on the data bus 164 into the latch 196. This data is then presented on output bus 194 and loaded by the counters 192 and 190 when the load signal LD on lines 198 and 200 are raised. The load signal LD may be generated by the microprocessor 110 or by other control circuitry not shown. Where and how it is generated is not critical to the invention as long as the duty cycle data on bus 198 is properly loaded into the counters 190 and 192. The clock signals on the line 188 are counted by the counters 190 and 192 by virtue of their application to the clock inputs at pins 2 of these two counters. The counters 190 and 192 are synchronous binary counter. The ripple carry output on line 202 from counter 192 is applied to the enable input of the counter 190, thereby enabling the counter 190 to begin counting after the counter 202 has reached its terminal count. Counters count down from the terminal count loaded by the duty cycle data on bus 194. The ripple carry output 204 from the counter 190 is the drive signal for the push-pull transistor 180. The duty cycle data on bus 194 determines the amount of time that the signal on line 204 is in a logic 1 state versus a logic 0 state. This "on-time" versus off time is the pulse width modulation or duty cycle which controls the amount of time the clutch coil 178 is being actively driven with current by the power MOSFET 182. The higher the duty cycle, the more the clutch coil 178 is in the "on" state. This translates to greater frictional force resisting movement of the simulated gearshift lever 32 (not shown).

The clutch coil 178 is protected by a resettable fuse 206. This fuse is a PTCI 1000 PF model manufactured by Midwest Components in the preferred embodiment. It is basically a collection of carbon particles suspended in an emulsion which heats up when current is driven through it. When the heat builds to a sufficient level, the emulsion expands thereby separating the carbon particles and opening the circuit. The resettable fuse 206 is needed because the electrically operated clutch is a 6 volt clutch, but it is being driven by a 15 volt source through the power MOSFET 182. The higher driving voltage is used such that the amount of force applied by the clutch can be rapidly increased despite the fact that inductors have relatively slow response to rapid changes in current therethrough. It is desirable to be able to implement very sudden increases in force to get a good simulation of an actual transmission. By driving the clutch coil with more voltage that it is designed for, the Ldi/dt transient response time of the clutch coil can be lowered to get rapid increases in current through the clutch coil, and therefore rapid increases in force applied to the gearshift lever. Because of this fact, there is an upper limit on the duty cycle to prevent burning out the clutch coil 178. As a backup safety mechanism, the resettable fuse 206 is used such that if power is applied to the clutch 178 for a time which exceeds a maximum allowable time, heating in the resettable fuse 206 causes the fuse to interrupt the current path from the 15 volt supply 208 through the clutch coil 178.

To simulate the feel of a synchro gate in a real transmission, the duty cycle is increased as the shift lever 32 is moved across the position of the gate in certain circumstances when the microprocessor 110 determines that the transmission should be allowed to enter a particular simulated gear.

The clutch coil 178 is driven slightly on at all times so that the gearshift lever 32 always has some drag imposed thereon. This is so that a reading from the strain gauge may always be obtained. The minimum duty cycle is around 15% to achieve this ability to always read the strain gauge.

Figure 11B:
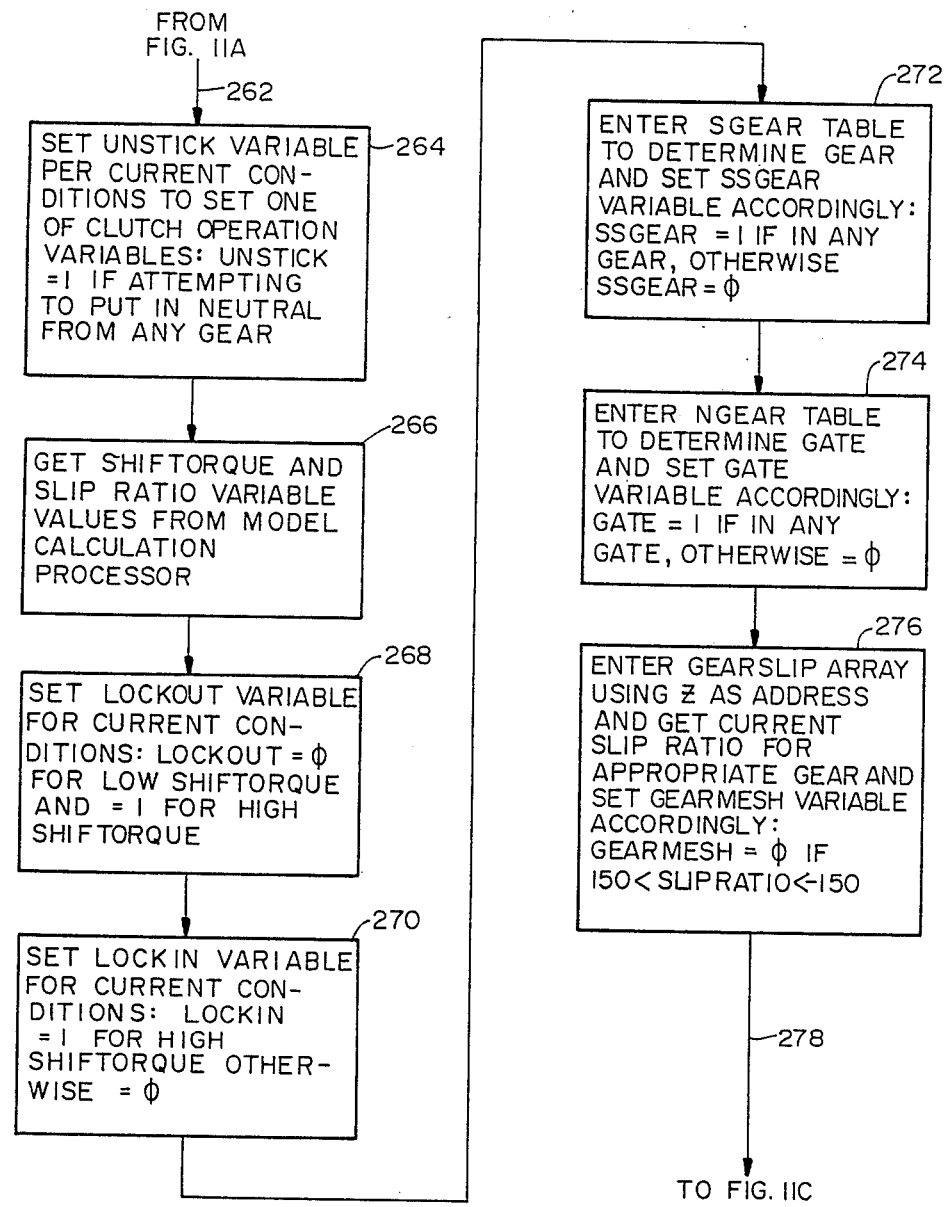

Referring to FIGS. 11A through 11C, there is shown a flow chart for the software which is run by the microprocessor 110 in FIG. 8 to control the operation of the electrically operated clutch or clutches in the simulated gearshift to give it a realistic feel. There is an autobalance routine which is performed upon every power up or reset which is used to balance the bridge coupled to the strain gauge. This routine begins at step 210 in FIG. 11A which symbolizes a call to the routine upon power on or reset condition occurring. The next step in the routine is symbolized by block 212 where the strain gauge output is read. This is done by addressing the analog-to-digital converter coupled to lines 116 and 162 in FIG. 9 (not shown) and reading the digital output representing the strain gauge condition. The purpose of the bridge balancing routine is to adjust the digital member sent to the digital-to-analog converter 122 in FIG. 9 until the signal BALANCE on line 126 is such that the output of the analog-to-digital converter coupled to lines 116 and 162 is within a desired range. This range can be experimentally determined for the particular application and is not critical to the invention.

The next step is symbolized by test 214 wherein it is determined whether or not the strain gauge output is below the desired range. If the answer is yes, step 216 is performed wherein a software variable called BIAS (hereafter software variables will be called variables and represent memory locations that contain numbers which vary but which may always be found at that address or whatever address is assigned currently to the variable in question) is decremented and written to the digital-to-analog converter 122 in FIG. 9. Step 216 also symbolizes the waiting period which the microprocessor implements to wait for the balance signal on line 126 to be generated and for all the transients in the bridge to settle down and a new output from the analog-to-digital converter coupled to lines 116 and 162 to be generated based on the new level for the balance signal 126. Thereafter, processing returns to step 212 to read the strain gauge output again.

If the test of step 214 indicates that the strain gauge output is not below the desired range, two distinct possibilities exist. First, the strain gauge output may be within the desired range in which event no further action is required. However, it is also possible that the strain gauge may be above the desired range. In this event the variable BIAS must be incremented to bring the strain gauge output down to a point within the desired range. Thus another test must be performed which test is symbolized by block 218.

If the test 218 determines that the strain gauge output is above the desired range, a step 220 is performed to increment the variable BIAS and write this new digital word to the digital-to-analog converter 122 shown on FIG. 9. After the new BIAS variable is sent, a waiting period is implemented to allow the transients to settle and to allow the converters to perform their conversion functions. Processing than returns to step 212 to once again read the strain gauge output. If step 218 determines that the strain gauge output is not above the desired range, then step 222 is performed to return processing to the main loop. Thus, the bridge balance routine periodically adjusts the balance of the bridge so as to optimize processing of output from the strain gauge or strain gauges.

The main loop of the game or simulator system contains a number of routines and subroutines which are not relevant to the invention being claimed herein. Therefore the details of the main loop are not given herein. One of the routines in the main loop however is the routine to handle the electrically operable clutches. This routine is symbolized by the start block 224 in FIG. 11A. This routine may be called periodically as by a timed interrupt or it may be called sporadically whenever the CPU running the main loop reaches a point in the main loop execution where it is appropriate to call the gearbox simulation clutch handling routine.

The first step in the gearbox simulation clutch handling routine is symbolized by block 226. This step sets a duty cycle variable to a number to cause the electrically operable clutches to impose a certain minimum amount of drag upon the gearshift lever. This duty cycle variable is the digital number sent to the latch 196 and the counters 190 and 192 in FIG. 10.

The next step is to read the position sensors to determine the gearshift lever position in the simulated gearshift pattern. This involves addressing the position sensor interface circuits 126 and 128 shown in FIG. 8 and reading the resistance values of a potentiometers used as the X and Y position sensors, shown as devices 54 and 78 in FIG. 8. Basically, the purpose of this step is to determine the position of the gearshift lever, but this is not as simple as it sounds. In a noisy environment with electrical noise being inductively coupled into the various signal lines in the circuitry, it is possible to get very erratic readings from the X and Y position sensors. Thus, it is preferred although optional, to use a software filter to limit this slew rate to a predetermined maximum rate to prevent noise spikes from causing the system to wrongly interpreting the position of the gearshift lever. That is, if for some reason the position sensor outputs are changing at greater than the predetermined slew rate, because of noise for example, or for any other reason, a software filter is implemented to limit the maximum slew rate to a predetermined amount. This provides for smoother operation of the system and eliminates a granularity which may sometimes otherwise occur.

Another problem which can occur arises in the interpretation of the outputs of the position sensors. The position sensor output may have any one of a number of different readings for the same gearshift lever position depending upon which teeth of the gears driving the position sensor from the gearshift lever pivot mechanism are engaged. Thus, in construction from one unit to the next, different position sensor readings may be obtained even though the gearshift lever is in the position of simulated second gear on all of the various units in any given sample lot. However, what is constant for all the units in a sample is the angle through which the gearshift lever moves in transitioning between any two gears or any two positions is always the same. Thus, the angle through which the potentiometer shaft turns for any given transition in the simulated gearshift pattern is the same. Accordingly, a second function of the software filter is to eliminate the effect of these construction errors from the operation of the system. This is done using "software windows". These windows are "moved" to eliminate the effect of the construction errors, and then, the position of the gearshift lever in the simulated gearshift pattern is determined by comparing the X and Y position sensor readings to the software window. For example, in the preferred embodiment, it is known that 92 digital counts represents the total angle through which the X position sensor moves when the gearshift lever is moved horizontally through the simulated gearshift pattern for maximum X excursion. That is, the analog output signal from the X transducer maps to two digital numbers separated by 92 when the X position transducer is rotated through the maximum X excursion. Similarly, the maximum Y excursion maps to two digital numbers separated by 89. An additional function of the software filter then is to adjust two variables called MPOTY and MPOTX so as to adjust the positions of the software windows to eliminate construction errors from affecting the system. The values MPOTX and MPOTY define the positions of the ends of the X and Y software windows, respectively. The constants 92 and 89 determine the positions of the other ends of the windows.

The above described functions of the software filter are symbolized by block 230 in FIG. 11A. The software filter limits the slew rate by comparing the digital value received from the X position sensor interface to a variable which defines the maximum desired slew rate for X transitions. If the maximum desired slew rate is exceeded, the software filter assigns a value for the X position transducer output which changes from its last output value at the maximum desirable slew rate. The same is done for Y transitions. Essentially, the raw values from the X and Y position sensors are read and accepted except if they are changing at values greater than the maximum desired slew rate. If they are changing faster than the desired slew rate, the raw potentiometer values are adjusted so that they are changing at the desired slew rate.

After the slew rate limitation function of the software filter is performed, a second function of adjusting the software windows is performed. This function is done by comparing the raw potentiometer values as adjusted by the slew rate limitation routine (hereafter routines, subroutines or sequences of instructions may sometimes be referred to as code) to the values for MPOTX and MPOTY. If the raw potentiometer readings received (as adjusted) are greater than the MPOTX and MPOTY variables, these variables are incremented thereby adjusting the positions of the X and Y software windows upwardly. If the raw potentiometer values (sometimes hereafter called POT values) do not exceed the MPOTX and MPOTY values, they are tested against the lower end of the windows, i.e., MPOTX minus 92 and MPOTY minus 89. If the raw POT values are lower than the lower ends of the windows, then the MPOTX and MPOTY variables are decremented. This slides the software position comparison windows downward. These comparison and adjustment steps for the MPOTX and MPOTY variables are performed each time the software filter step 230 is performed. This has the effect of continually adjusting the software position comparison windows until the windows encompass the raw POT values received from the slew rate limiting code.

Next, it is necessary to determine the actual X and Y gearshift lever position in the simulated gearshift pattern. This code is symbolized by block 232 which represents a series of tests which compare the software filtered POT values, called the POTX and POTY variables, to various locations in the X and Y software windows used for position comparison. These various locations define the positions of, for example, first, second, third, fourth and reverse gears, as well as the neutral band and the synchro bands separating neutral from the various gear positions.

Figure 12:
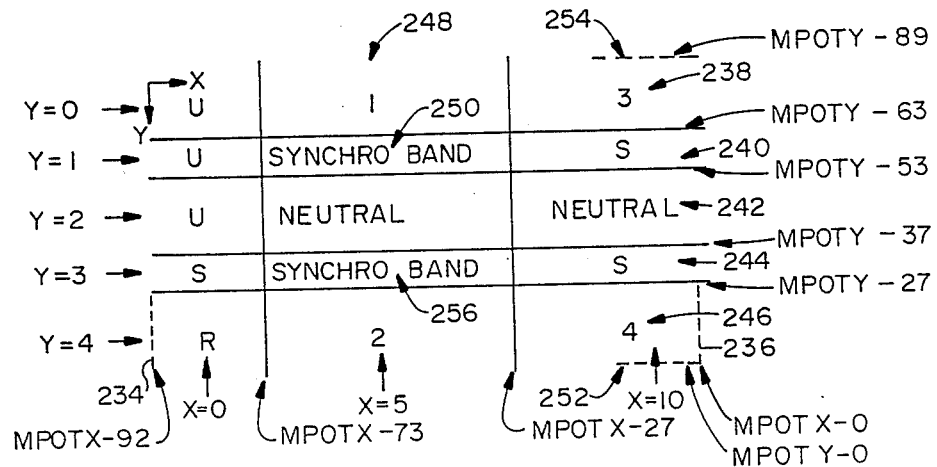
FIG. 12 is a diagram of the simulated gearshift pattern illustrating the software windows used for position determination.

FIG. 12 illustrates how a typical 4-speed simulated gearshift pattern is defined in terms of X and Y coordinates for the gear positions, the neutral band and the synchro bands. Step 232 consists essentially of a plurality of tests wherein the X and Y position sensor raw data, POTX and POTY, as filtered by the software filter step 230, are compared to a plurality of locations in the software windows for X and Y position determination. Essentially, the X position determination is performed using two dividing lines along the horizontal axis of the simulated gearshift pattern as the values against which the POTX and POTY values are tested. These two dividing lines are: MPOTX minus 73; and, MPOTX minus 27, as labeled in FIG. 12. The software window for X position determination is defined by the dashed lines labeled 234 and 236 in FIG. 12. The line 234 defines the lower extent of the software window as defined by the variable MPOTX minus 92, whereas the dashed line 236 represents the upper end of the software window as defined by the variable MPOTX. The raw X position data, as filtered by the software filter step 230 in FIG. 11A, is the POTX variable. The code represented by the block 232 is a pair of tests which compare the POTX variable to the position in the software window defined by the variable MPOTX minus 73 and MPOT minus 27. If POTX is less than MPOT minus 73, then a variable X is set to zero, which means that the shift lever is somewhere to the left of the dividing line represented by the variable MPOTX minus 73. This means that the gearshift lever is either in reverse or in some position which is undefined as represented by the U's in the simulated gearshift pattern of FIG. 12. If the POTX variable is greater than MPOTX minus 73, then another comparison is made to determine if the POTX variable is greater than the variable represented by MPOTX minus 27. If it is greater, then the variable X is set to 10, meaning that the gearshift lever is either in third gear as shown at 238 or is in the synchro band for third gear at 240 or is in the neutral band at 242 or is in the synchro band for fourth gear at 244 or is in fourth gear as shown at 246, i.e., is somewhere in the band labeled X=10 in FIG. 12. Exactly where the gearshift lever is is not known until the Y position determination is made by other code represented by the block 232.

Previous to the two X position determination tests just described, the variable X was set equal to 5. Thus, if the second test just described has failed, then no change in the variable X is made, and the variable X remains at the value 5, meaning that the simulated gearshift lever is somewhere in the band labeled X=5 in FIG. 12. This means that the simulated gearshift lever can either be in the position for first gear at 248 or the synchro band for first gear at 250, etc.

Following the X position comparison tests, there is a code which represents a further series of tests to determine the Y position. This code is also represented by block 232 in FIG. 11A and may either precede or follow the code for determining the X position. There are more tests for comparison of the software-filtered POTY position variable than there were for the filtered POTX position variable. The reason for this is that there are two synchro bands that must be accounted for in the simulated gearshift pattern so that the slight increase in resistance on an actual gearshift lever when transitioning into a gear from neutral or out of gear into neutral may be simulated. This slight increase in force is due to the operation of the synchronizing elements in actual transmissions which serve to cause the two gears to be meshed to be rotating at approximately the same angular velocity prior to meshing of the gears such that gear clashing is minimized. The software window for comparison to the filtered POTY position data for purposes of Y position determination is defined by the dashed lines 252 and 254 representing, respectively, the variables MPOTY and MPOTY minus 89. The various possible Y positions are as labeled at the left side of FIG. 12, i.e., a variable Y may be set to any of the values 0–4. The Y variable values 1 and 3 represent the simulated gearshift lever being in the simulated synchro bands 250 and 256. The Y position determination represents a series of tests to determine if the filtered Y position data MPOTY is greater than a number of positions within the Y position software window. These various variable values are labeled on the right edge of FIG. 12 as the variables MPOTY and minus 89, MPOTY minus 63, MPOTY minus 53, MPOTY minus 37, and MPOTY minus 27. This series of tests start out by comparison of the variable value POTY to determine if it is greater than the variable value MPOTY minus 27. If it is, the variable Y is set equal to 4. Then, the variable POTY is compared to the variable MPOTY minus 37 to determine if it is greater than this value. If it is, than Y is set equal to 3. If it is not, the POTY variable is compared to MPOTY minus 57. If it is greater, then Y is set equal to 2. This process continues until the Y position is determined.

Once the X and Y variable values have been defined, the position in the simulated gearshift pattern of FIG. 12 is known. This is done by adding the X and Y variable values to generate a variable Z. This variable Z is used as the address into an array which determines the gearshift lever position for the simulated transmission. This gearshift array also contains data regarding the slip ratio between the various gears in the simulated transmission. The slip ratio data for any particular gear in the simulated gearshift pattern represents the difference in rotational speed between the gear connected to the engine and the gear connected to the wheels of the simulated vehicle. For example, in the case of second gear, the slip ratio would be the difference in rotational velocity between the gear coupled to the engine which is to be engaged with the gear called "second gear" which is connected to the wheels. If the slip ratio is too high between these two gears, then the gears cannot be meshed without excessive grinding in an actual transmission. The slip ratio data is written into memory by a model calculation processor which is not shown and which is not part of the system of the invention. This model calculation processor receives other user inputs which define the state of the simulated vehicle and applies these user inputs to free body model equations to generate display data showing how the vehicle is responding in the simulated universe to user inputs and generates other data such as the slip ratio data described above and shift torque data. The shift torque data represents the amount of torque passing through the simulated transmission. This shift torque depends upon the status of the car and, in particular, upon the status of the power being applied to the engine and whether or not the clutch is engaged or not engaged. Shift torque is zero if the clutch is disengaged such that no power is being coupled to the simulated transmission. The manner in which the shift torque and slip ratio data is used will be described in more detail below.

The next step in the process is to determine whether or not the operator is pushing or pulling on the gearshift lever at whatever position in the simulated gearshift pattern in which the simulated gearshift lever currently resides. This process is represented by block 260 in FIG. 11A. The code which implements this process tests a variable YSTRAIN against a constant. The variable YSTRAIN is set equal to the output from the analog-to-digital converter which is coupled to the strain gauge. If the YSTRAIN value is greater than the constant, a variable called strain is set equal to 1. If the variable YSTRAIN is less than another constant, then the variable STRAIN is set equal to −1. The variable STRAIN then defines whether the operator is pulling or pushing on the gearshift lever indicating to the processor whether the operator is trying to enter a gear through a synchro band or pull the simulated transmission out of a gear through a synchro band.

There are a number of variables which must be set to appropriate values which encode current conditions both in the simulated transmission and which encode the intent of the operator before the electrically operated clutch may be driven to set an appropriate friction level on the gearshift lever. The UNSTICK variable is one of these. Block 264 in FIG. 11B is the next procedure which is performed as indicated by path 262 and represents setting the UNSTICK variable to the appropriate value to encode current conditions. The UNSTICK variable encodes the operators intent in the sense of the measured strain on the gearshift lever, vis-a-vis the gearshift lever position. The UNSTICK variable will be set to 1 if the gearshift lever is currently in a position in the simulated gearshift pattern representing reverse, second gear or fourth gear, or is in a synchro gate preceding one of these gears and the operator is pushing on the gearshift lever. UNSTICK will also be set equal to 1 if the simulated gearshift lever is in first gear or third gear or one of the synchro bands preceding one of these gears and the operator is pulling on the simulated gearshift lever. When UNSTICK is 1, it means the operator is trying to pull the simulated gearshift lever or push the simulated gearshift lever to take the simulated transmission out of gear and place it in neutral.

Block 266 in FIG. 11B represents the process of getting the shift torque and slip ratio variable values from the model calculation processor. Block 266 represents the continuous updating of these variable values by the model calculation processor by write operations to the addresses assigned to these variables.

The next block, 268 represents the process of setting the LOCKOUT variable. This variable is another one of the set up variables which plays a role in the decision making code to be described below which controls the operation of the electrically operated clutch. The LOCKOUT variable is set to zero if the shift torque is between 10 and −10. Otherwise, LOCKOUT is set to 1. When LOCKOUT is set to 1, high shift torque values exist meaning that it should be very difficult or impossible to change gears in the transmission. In an actual transmission, it would be difficult or impossible to pull the transmission out of gear if high shift torque was passing through the transmission. Further, it would be difficult or impossible to put the transmission in a gear from neutral if large amounts of torque were being applied to the gear connected to the engine.

Block 270 represents the process of setting the LOCKIN variable for current conditions. LOCKIN is set equal to 1 for high shift torque values greater than 20 or less than −20. Otherwise, LOCKIN is set equal to zero. The LOCKOUT variable is used to operate the clutch to prevent entering a gear if the shift torque is greater than 10 or less than −10. The LOCKIN variable is used to operate the clutch so as to lock the simulated transmission in gear if the shift torque is greater than 20 or less than −20. The difference in these ranges reflects the reality which would be present in an actual transmission.

The next step, represented by block 272, represents the process of using the value of the Z variable to enter an array called SGEAR to determine what gear the simulated transmission is in if any. That is, the SGEAR table defines the simulated gearshift pattern in terms of the Z variable. For any given value of Z, there is a linear array entry which defines the gear represented by that Z value or the synchro band represented by that Z value in terms of the gear number and, in some embodiments, the slip ratio for that gear. In other embodiments, a separate table for the slip ratio data may be used. If the simulated transmission is engaged in any gear, a variable SSGEAR is set equal to 1. Otherwise, the variable SSGEAR is set equal to zero. The variable SSGEAR is another one of these set up variables which is necessary in making determinations as to how to operate the electrically operated clutch.

The block 274 represents the process of entering another table called NGEAR to determine in which synchro gate the simulated gearshift lever currently resides if any. This information is retrieved from the NGEAR table using the Z variable as an address. A GATE variable is set according to the results of this table access. The GATE variable is set equal to 1 if the simulated gearshift lever is in the position of any synchro gate. Otherwise it is set to zero.

The block 276 represents the process of using the Z variable as an address to enter a gear slip array. The gear slip array contains the slip ratio data for all of the possible gears in the simulated transmission. This data is continuously updated by the model calculation processor, and the entries of this gear slip array are continuously updated as symbolized by the process of block 266. Having accessed this array, the current slip ratio for the appropriate gear is determined and the value of a GEARMESH variable is set accordingly. The GEARMESH variable is set equal to zero if the slip ratio is greater than 150 or less than −150. GEARMESH equals zero when the slip ratio is too high to allow meshing of the gears required by the proposed manipulation of the simulated transmission by the operator. In other words, if the simulated vehicle is traveling at a simulated velocity of 90 mph, the GEARMESH variable will be set such that the operator will not be allowed to place the simulated transmission in first gear or reverse.

This completes set up of all the clutch control variables. Processing now turns to the decision making phase where the conditions in the simulated transmission are divined by examination of these set-up variables, and appropriate digital words are generated for causing the electrically operated clutch to generate frictional forces appropriate to the situation to emulate the forces which would be felt by the manipulation of an actual gearshift lever in a similar situation in real life.

The code for controlling the electrically operated clutch begins with a transition along path 278 from block 276 to test 280 on FIG. 11C. The purpose of this test is to check the value of the SSGEAR variable to determine whether or not the simulated transmission is in gear. If it is, SSGEAR is equal to one and transition to test block 282 along the "yes" path (marked Y; "no" paths are marked N) occurs. The purpose of test 282 is to determine if the LOCKIN variable is equal to one so as to determine the level of the shift torque. If LOCKIN is equal to one, high shift torque exists and a transition along the yes path to I/O operation 284 is performed. This I/O operation sets the value of a variable SDBREAK to 90 h (90 in the hex numbering system) representing a very high drag in the gearshift lever such that the gearshift lever cannot be moved. If the shift torque is low, transition along the no path to test 286 is performed. The purpose of test 286 is to determine the level of shift torque as reflected by the LOCKOUT variable. This variable is set equal to one for a different range of shift torques than the variable LOCKIN as discussed above. If LOCKOUT is equal to one, high shift torque exists in transition along the yes path to I/O operation 288 is performed. In this I/O operation the SD BREAK variable is set to 50 HEX. As in the case of I/O operation 284, the hex variable set in the I/O operation is written to the counters illustrated at 190 and 192 in FIG. 10 and controls the duty cycle. This duty cycle sets the amount of drag imposed by the electrically operated clutch on the simulated gearshift lever. The duty cycle number 50 h represents a level of friction where the simulated gearshift lever may be moved but not easily.

If LOCKOUT is equal to zero, low shift torque exists and transition to the I/O operation represented by block 290 is performed. This I/O operation sets the SD BREAK variable to 10 hex which represents a low duty cycle and very low friction on the simulated gearshift lever.

After performing any of the I/O operations represented by blocks 284, 288 and 290, transition along path 292 is performed to the return operation 294 wherein control is returned to the main loop from the electrically operated clutch routine.

If the results of the test 280 are that the simulated transmission is not in gear, transition along the no path is made to the test represented by block 296. This test determines whether the value of the GATE variable is equal to one. If it is, the simulated gearshift lever is in the position of a synchro gate, and transition along the yes pathway to the test of 298 is performed. The purpose of test 298 is to determine the value of the UN-STICK variable. If UNSTICK is equal to one, then the operator is attempting to put the transmission in neutral from some gear and is in the synchro gate on the way to neutral. If UNSTICK is equal to one, transition along the yes pathway to I/O operation 300 is performed. There, the variable SDBREAK is set to 40 hex which causes the electrically operated clutch to impose a medium level of drag such that the simulated gearshift lever may be moved but is not totally free of friction.

If UNSTICK is equal to zero, the operator is either not trying to move the simulated gearshift lever or is trying to move the simulated gearshift lever into gear from the synchro gate position. Transition along the no path will result, and the test of block 302 will be performed. This test is to determine if LOCKOUT is equal to one and the variable GEARMESH is equal to zero. If these two conditions are both true, then the result of the test 302 will be true and transition along the yes path to I/O test 304 will be performed where the SDBREAK variable is set to 90 hex. Transition along the yes pathway means that high shift torque exists and a high slip ratio exists. In an actual transmission under these conditions, an operator would not be allowed to place the transmission in gear by the operation of the synchro gates. Therefore, the duty cycle is set to impose a high degree of friction on the simulated gearshift lever such that the gearshift lever cannot be moved. If either the shift torque is low or the slip ratio is low or both are low, transition along the no pathway to the I/O procedure 306 occurs. In this I/O operation, the SDBREAK variable is set to 40 hex to impose a medium level of drag on the simulated gearshift lever.

If the test of block 296 determines that the variable is equal to zero, then the simulated transmission is neither in gear nor in a synchro gate. In such a case, transition along the no pathway to I/O operation 308 is performed. In this I/O operation, the SDBREAK variable is set to 10 hex to impose a minimum level of drag on the gearshift.

After any of the I/O operations 300, 304, 306 or 308 are performed, transition is made to the return block 294 where return to the main loop is performed.

Although the invention has been described in terms of the preferred embodiment disclosed herein, those skilled in the art will appreciate many modifications which may be made without departing from the true spirit and scope of the invention. All such modifications are intended to be included within the scope of the claims appended hereto.

What is claimed:

1. An apparatus for simulating the feel of the gearshift lever for a manual transmission of an actual vehicle in a vehicle simulator, comprising:
   a frame;
   a simulated gearshift lever;
   pivot means coupling said gearshift lever to said frame so said simulated gearshift lever can be moved in at least two axes relative to said frame;
   electrically operable clutch means coupled between said frame and said pivot means for causing resistance to movement of said simulated gearshift lever in accordance with a control signal;
   sensor means coupled to said simulated gearshift lever for determining its position relative to said frame and for determining the direction and amount of strain in said simulated gearshift lever; and
   control means coupled to said sensor means and to said electrically operable clutch means and having an input for receiving data regarding the amount of torque being applied to said simulated manual transmission and regarding the relative angular velocities between the gears in said simulated transmission for evaluating the position of said simulated gearshift lever in a simulated gearshift pattern, the direction of strain, the level of torque being applied and the relative angular velocity between any two gears in said simulated transmission to be engaged and for generating an appropriate control signal to cause said electrically operable clutch to simulate the forces which would be felt in an actual manual transmission being operated in similar circumstances.

2. The apparatus of claim 1 wherein said control means includes means to simulate the slight increase in resistance to movement of the gearshift lever of an actual manual transmission as the simulated gearshift lever is moved through the location in said simulated gearshift pattern where the effects of synchro gates in said actual transmission would be felt in the actual shift pattern.

3. The apparatus of claim 2 wherein said control means includes means to generate said control signal to prevent movement of said simulated gearshift lever when said simulated transmission is in a simulated gear and the data defining the simulated torque being applied to said simulated transmission indicates said simulated torque is outside a first predetermined range.

4. The apparatus of claim 3 wherein said control means includes means to generate said control signal so as to substantially resist but not stop movement of said simulated gearshift lever if sufficient force is applied to it if the data defining said simulated torque indicates said torque is outside a second predetermined range including fewer values of torque than said first predetermined range.

5. The apparatus of claim 4 wherein said control means includes means for determining whether said simulated transmission is in gear, and, if not in gear, for determining from data from said sensor means if the position of said simulated gearshift lever is in a position where the effect of a synchro gate in a real transmission would be felt and for determining from data from said sensor means if an operator of said simulator is trying to put said simulated transmission in neutral and for generating said control signal to substantially resist but not stop movement of said simulated gearshift lever.

6. The apparatus of claim 4 wherein said control means includes means for determining whether said simulated transmission is in gear, and, if not in gear, for determining from data from said sensor means if the position of said simulated gearshift lever is in a position where the effect of a synchro gate in a real transmission would be felt and for determining from data from said sensor means if an operator of said simulator is trying to put said simulated transmission in any gear, and for generating said control signal to stop movement of said simulated gearshift lever.

7. An apparatus for simulating for an operator the look and feel of a real gearshift lever for a manual transmission in a vehicle, comprising:
   a gearshift means including a base and having a gearshift lever and pivot means pivotally connecting said gearshift lever to said base for allowing said gearshift lever to be pulled and pushed through a simulated gearshift pattern with a variable amount of resistance to movement thereof, and further comprising resistance means coupled to said base and to said pivot means for receiving a control signal and for causing resistance to movement of said gearshift lever in said simulated gearshift pattern in accordance with said control signal and further including strain gauge means coupled to said gearshift lever for detecting the approximate direction of force being applied to said gearshift lever and further comprising position sensor means for sensing the position of said gearshift lever; and
   control means coupled to said position sensor means and to said strain gauge means and to said resistance means for gathering data indicating the simulated conditions affecting said vehicle, the position of said gearshift lever in said simulated gearshift pattern and the direction of force being applied by said operator on said gearshift lever, and for generating said control signals to cause said resistance means to cause resistance similar to that which would be felt through an actual gearshift lever of an actual transmission under similar conditions.

8. The apparatus of claim 7 wherein said gearshift lever represents the gearshift lever of a simulated transmission having simulated gears coupling a simulated engine of a simulated vehicle to a simulated driving mechanism, and wherein said control means includes means for determining the type and amount of strain in said gearshift lever, the position in said simulated gearshift pattern of said gearshift lever, the amount of simulated shift torque being applied to said simulated gears of said simulated transmission and the relative angular velocity in terms of a slip ratio between the simulated gears of said simulated transmission and for taking all these conditions into account when generating said control signal so that said resistance means causes similar resistance to movement of said gearshift lever as would be felt in moving an actual gearshift lever coupled to an actual manual transmission operated in a similar manner under similar vehicle conditions.

9. The apparatus of said claim 8 wherein said simulated transmission has simulated synchro gates in the form of synchro bands between a neutral band and any gear position in said simulated gearshift pattern which are passed through when said gearshift lever is moved into or out of said neutral band, and wherein said control means includes means to cause said resistance means to cause an increase in resistance to movement to be applied to said gearshift lever when said gearshift lever is moved so as to pass through one of said simulated synchro gates en route to placing said simulated transmission in a selected gear or driving condition.

10. The apparatus of claim 9 wherein said control means includes means for sensing when the simulated shift torque applied to a simulated gear is outside a predetermined range and for generating said control signal for causing said resistance means to prevent the shift lever from being moved.

11. The apparatus of claim 7 further comprising means in said control means for determining if said simulated transmission is not in gear and, if not, for determining said shift torque and said slip ratio from data defining the current values for said shift torque and said slip ratio and for determining if said operator is trying to put said simulated transmission into gear by reading data from said position sensor means and from said strain gauge means, and, if said shift torque is outside a predetermined range and if said slip ratio is above a predetermined value, for generating a control signal for causing said friction means to prevent movement of said gearshift lever.

12. An apparatus for creating a realistic feel for a simulated gearshift of a simulated transmission of a simulated vehicle to emulate an actual gearshift in an actual transmission in an actual vehicle if subjected to similar conditions, comprising:
   gearshift means having an input for a control signal for emulating, under the influence of said control signal, the feel of said actual transmission, said gearshift means having a gearshift lever and a simulated shift pattern;
   force determination means coupled to said gearshift means for determining the position of said gearshift lever in said simulated shift pattern and for determining the direction of real forces being applied to said gearshift lever and for determining predetermined simulated conditions in said simulated transmission caused by simulated driving of said simulated vehicle; and
   control means coupled to said gearshift means and to said force determination means for determining the forces a driver would feel through the gearshift lever of an actual transmission similar to said simulated transmission if said actual transmission was subjected to the same forces and conditions found by said force determination means and for generating said control signals in such a manner to cause said gearshift means to resist or fail to resist movement of said gearshift lever so as to simulate the real forces a driver would feel in manipulating said actual transmission in the manner said driver is attempting to manipulate said simulated transmission.

13. The apparatus of claim 12 wherein said gearshift means includes pivoting means coupled to said gearshift lever for allowing said gearshift lever to pivot in appropriate directions to simulate a real gearshift pattern and includes an electrically operable clutch coupled to said control signal input and to said pivoting means and wherein said gearshift means and said control means combine to simulate real world forces by operation of said electrically operable clutch imposing frictional forces on said pivoting means in response to said control signal.

14. The apparatus of claim 13 wherein said gearshift means includes at least one strain gauge mounted on said gearshift lever so as to measure strain in the material of said gearshift lever when force is exerted on said gearshift lever in such a manner that the general direction of said force exerted on said gearshift lever can be deduced, said strain gauge being coupled to said control means.

15. The apparatus of claim 14 wherein said gearshift means includes position sensor means coupled to said control means for generating position indication signals indicating the position in said simulated shift pattern of said gearshift lever, and wherein said control means includes means coupled to receive said position indication signals from said position sensor means and coupled to read data from said strain gauge for determining the location in said shift pattern of said gearshift lever and for determining whether an operator is pulling on or pushing said gearshift lever.

16. The apparatus of claim 15 wherein said control means has inputs to receive torque data indicating a simulated torque applied to the simulated gears in said simulated transmission, and slip data indicating the relative slip ratio in terms of the relative angular velocity between various ones of said simulated gears in said simulated transmission, both said torque data and said slip data supplied from any external source and representative of conditions then existing affecting the movement or lack thereof of said simulated vehicle, and wherein said control means further comprises means for analyzing said torque data and said slip ratio data and the position of said gearshift lever in said simulated shift pattern and for analyzing whether said gearshift lever is being pulled or pushed so as to put said simulated transmission into gear or into neutral and for analyzing whether said gearshift lever is in a position in said simulated shift pattern where the effect of synchro gates in a real transmission would be felt and for generating said control signal for use by said electrically operable clutch in applying forces to said gearshift lever to simulate the forces if the same movements of the gearshift lever of a real transmission similar to said simulated transmission were to be made under similar operating conditions then existing for said simulated transmission and said simulated vehicle.

17. An apparatus for creating a realistic feel for a simulated gearshift, comprising:
gearshift means for a simulated transmission in a simulated vehicle and having a gearshift lever and a simulated shift pattern for simulating the look and feel of actual movements through an actual shift pattern of an actual gearshift in a vehicle and having pivoting means for allowing said gearshift lever to pivot about at least two axes;
clutch means coupled to said pivoting means and having a control signal input for receiving a control signal, for applying an amount of force proportional to said control signal to said pivoting means to cause resistance to movement by said shift lever along at one of said axes;
sensor means coupled to said pivoting means for generating a first signal from which the position of said shift lever in said simulated gearshift pattern may be ascertained;
strain gauge means coupled to said gearshift lever for sensing the degree of strain in said gearshift lever and for generating a second signal from which it may be determined when an operator is pulling or pushing on said gearshift lever and in what direction;
control means coupled to said strain gauge means, said sensor means and said clutch means and having an input for receiving third and fourth signals, said third signal defining a simulated torque through said simulated transmission and said fourth signal defining a simulated slip ratio of gear speeds between various simulated gears in said simulated transmission, for interpreting said first signal to determine the present position of said gearshift lever in said simulated gearshift pattern, and for interpreting said second signal to determining whether the operator is trying to push the gearshift lever into a gear position of said simulated shift pattern or pull the gearshift lever out of a gear position in said simulated gearshift pattern and for interpreting said third and fourth signals to determine if conditions in said simulated transmission are such that if the same conditions existed in said actual transmission the operator would be able to make a gearshift lever movement on said actual transmission corresponding to the desired movement of said gearshift lever of said simulated transmission, and for generating said control signal appropriately to cause said clutch means to apply an amount of force to said pivoting means which simulate the actual forces which would be felt by said operator in making the corresponding movement of the gearshift lever of said actual transmission including the increase in resistance to movement due to the effect of synchro gates in an actual transmission.

18. An apparatus for simulating the look and feel of a real gearshift for a vehicle, comprising:
a gearshift means having a gearshift lever and means to allow said gearshift lever to be pulled and pushed through a simulated gearshift pattern with a variable amount of resistance to movement thereof, including resistance means for receiving a control signal and for causing resistance to movement of said gearshift lever in accordance with said control signal; and
control means for gathering data indicating the simulated conditions affecting said vehicle and for generating said control signals to cause said resistance means to cause resistance similar to that which would be felt through the gearshift lever of an actual transmission under similar conditions.

19. The apparatus of claim 18 wherein said gearshift lever represents the gearshift lever of a simulated transmission having simulated gears coupling a simulated engine of a simulated vehicle to a simulated driving mechanism, and wherein said control means includes means for determining the type and amount of strain in said gearshift lever, the position in the simulated shift pattern of said gearshift lever, the amount of simulated torque being applied to said simulated gears of said simulated transmission and the relative angular velocity between the simulated gears of said simulated transmission and for taking all these conditions into account when generating said control signal so that said resistance means causes similar resistance to movement of said gearshift lever as would be felt in moving a gearshift lever in a similar manner under similar circumstances.

20. The apparatus of said claim 19 wherein said simulated shift pattern has a neutral band and wherein said simulated transmission has simulated synchro bands which are passed through when said gearshift lever is moved into or out of said neutral bands, and wherein said control means includes means to cause said resistance means to cause a slight increase in resistance to movement of said gearshift lever when said gearshift lever is moved so as to pass through one of said simulated synchro bands en route to placing said simulated transmission in a selected gear or driving condition.

21. The apparatus of claim 20 wherein said control means includes means for sensing when the torque applied to a simulated gear in said simulated transmission is outside a predetermined range and for generating said control signal so as to cause said resistance means to prevent the shift lever from being moved so as to pull said simulated transmission out of the gear.

* * * * *

UNITED STATES PATENT AND TRADEMARK OFFICE
CERTIFICATE OF CORRECTION

PATENT NO.    : 4,949,119
DATED         : August 14, 1990
INVENTOR(S)   : Rick L. Moncrief et al.

It is certified that error appears in the above-identified patent and that said Letters Patent is hereby corrected as shown below:

Column 10, line 29, "than" should read --that--.
Column 11, line 40, "that" should read --than--.

Signed and Sealed this

Fifteenth Day of September, 1992

Attest:

DOUGLAS B. COMER

*Attesting Officer*        *Acting Commissioner of Patents and Trademarks*